Figure 1:
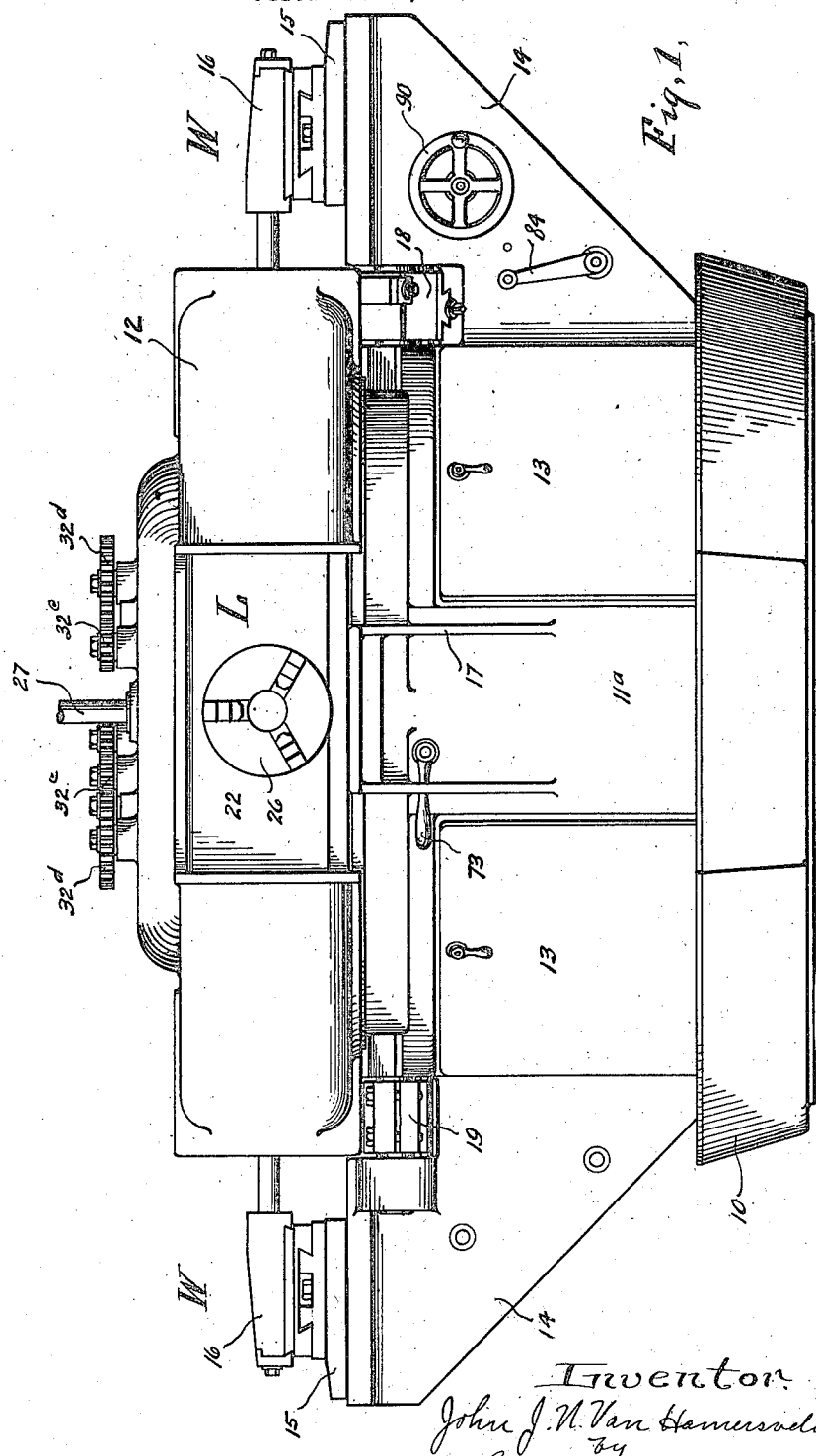

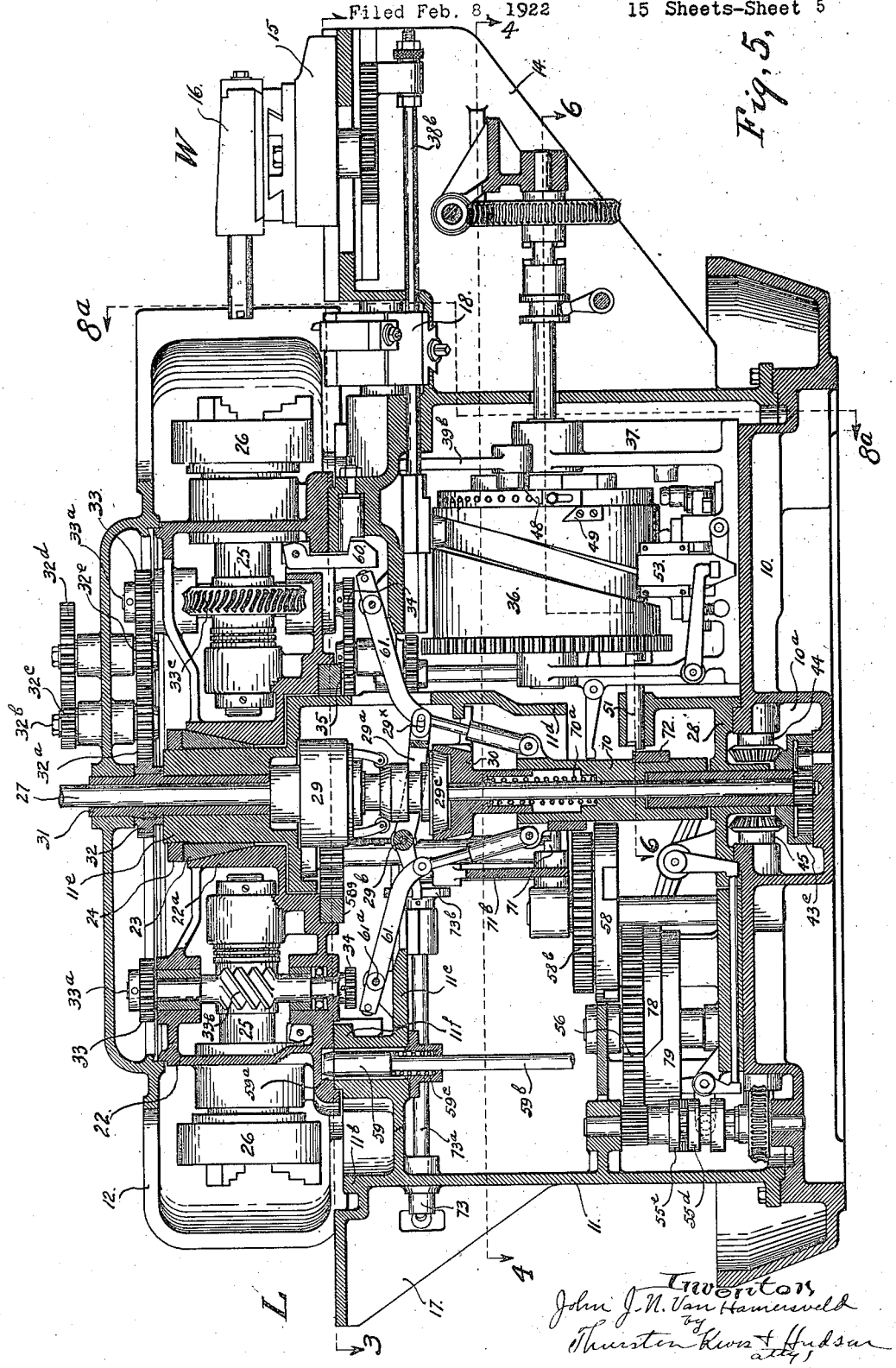

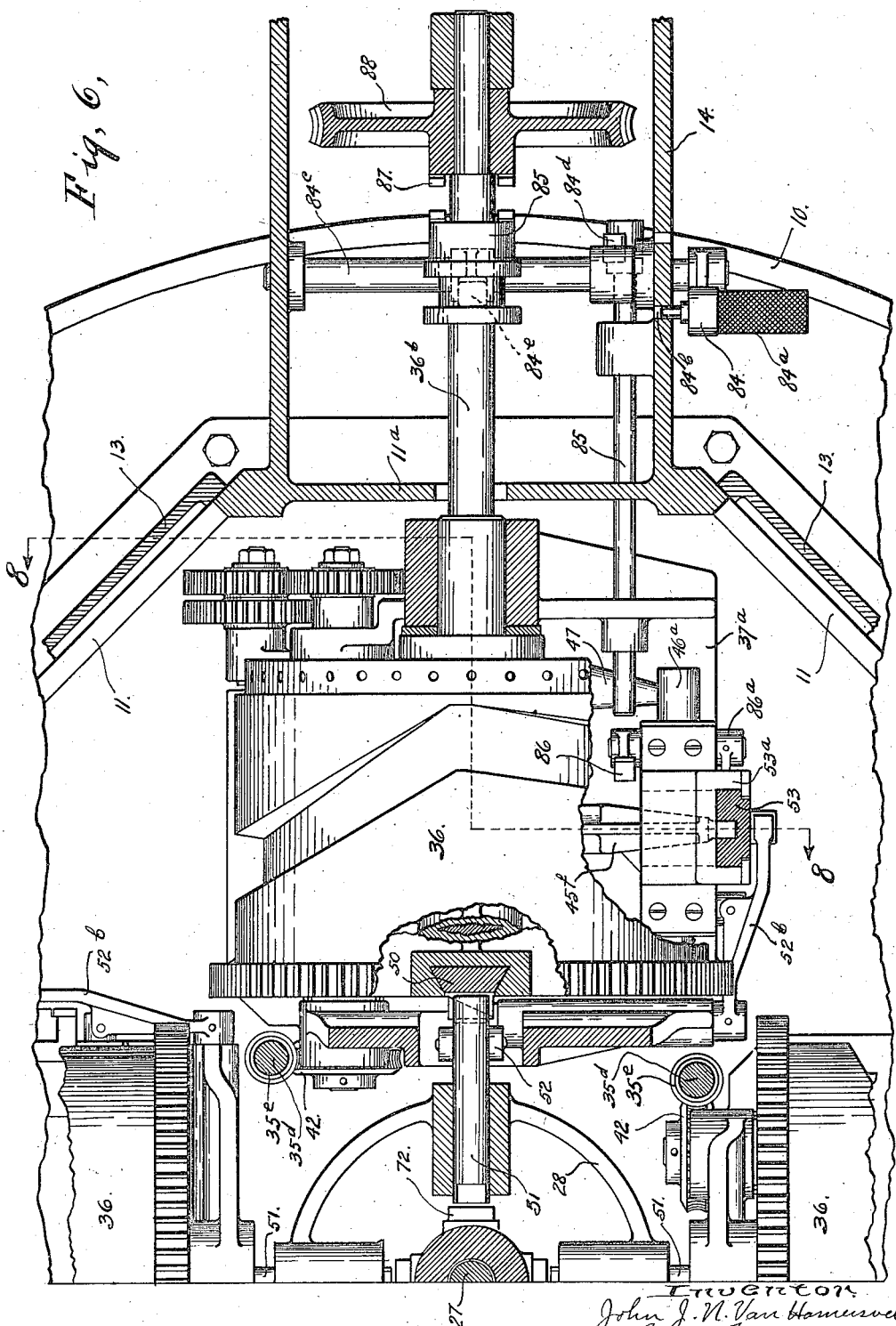

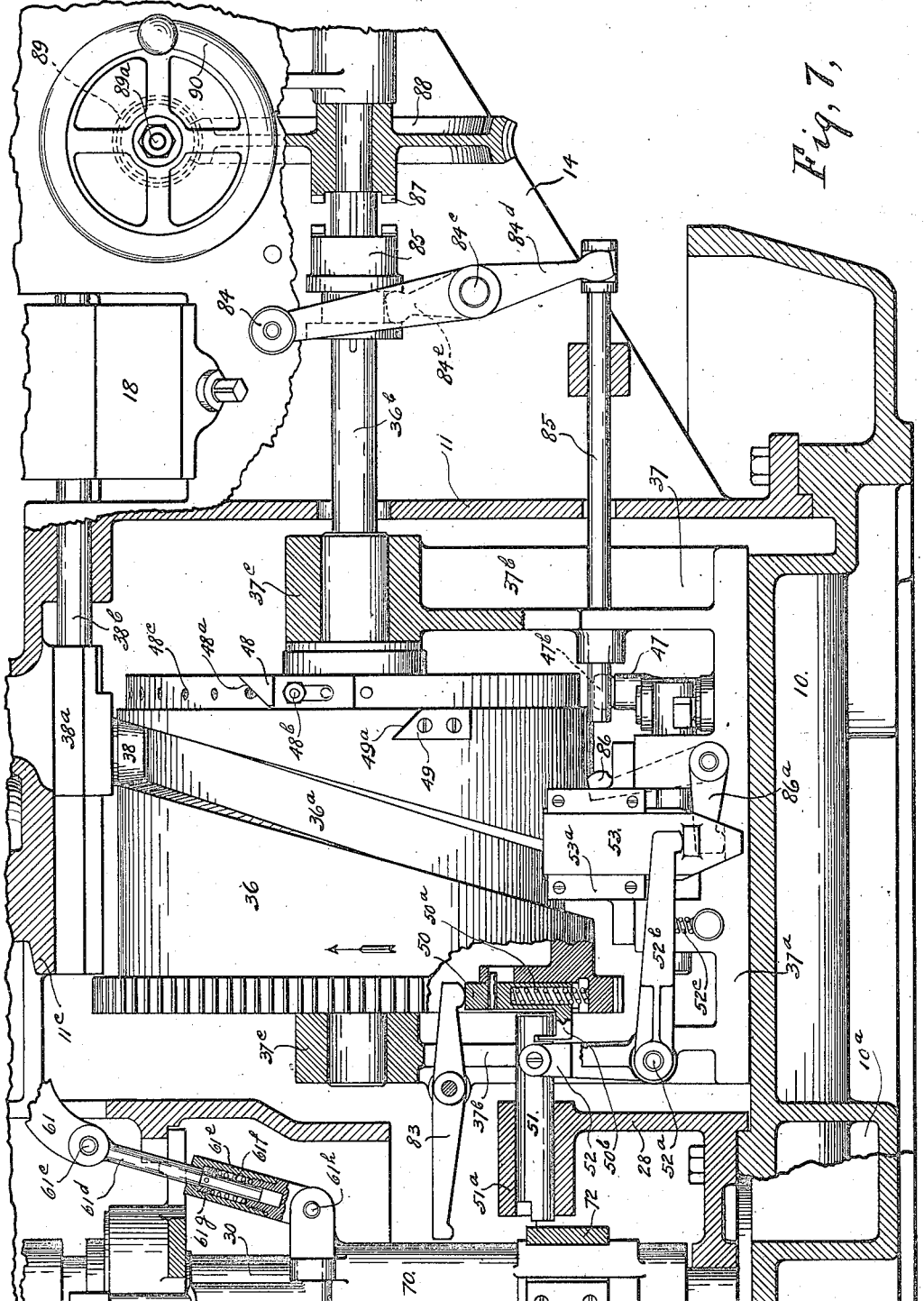

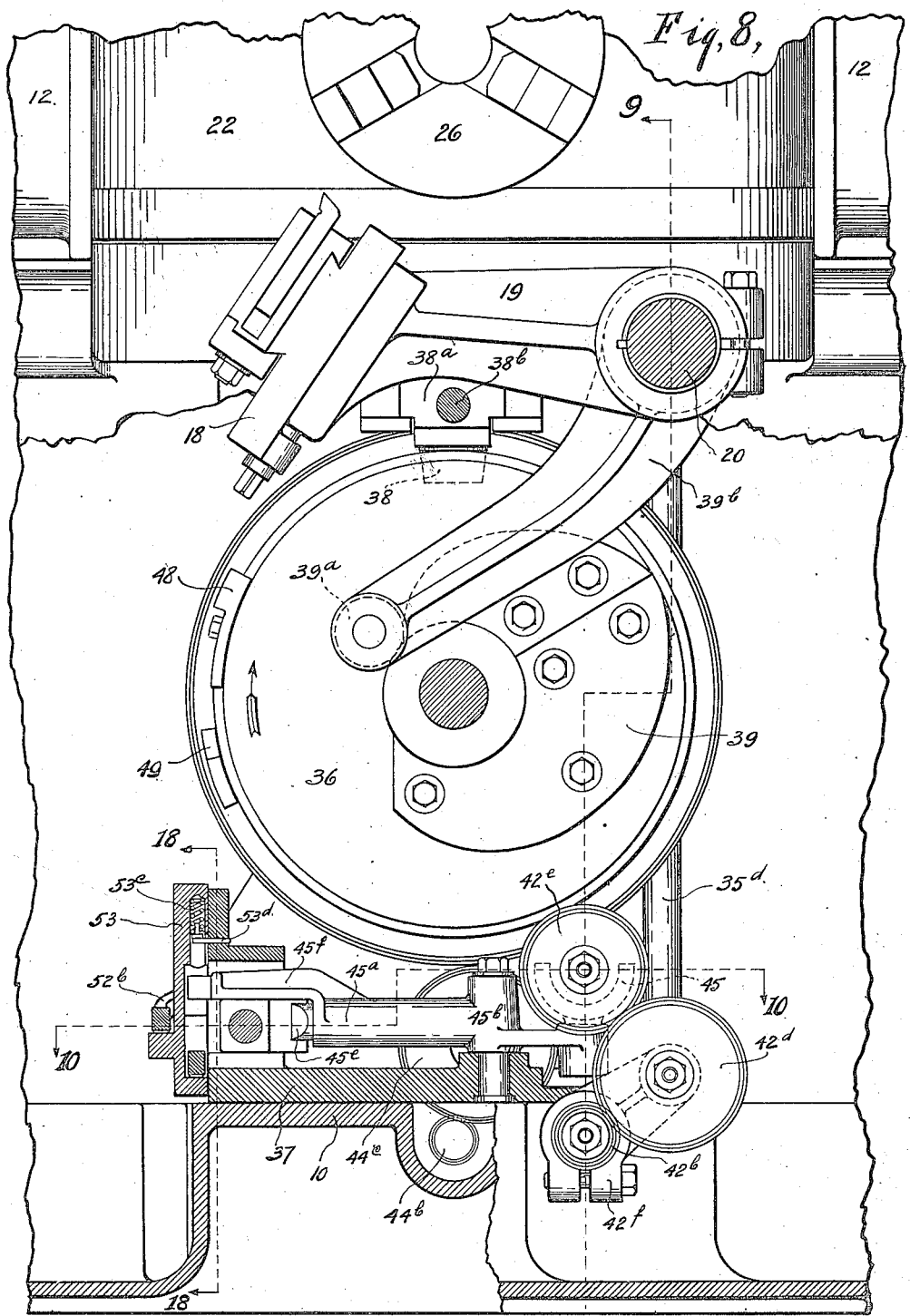

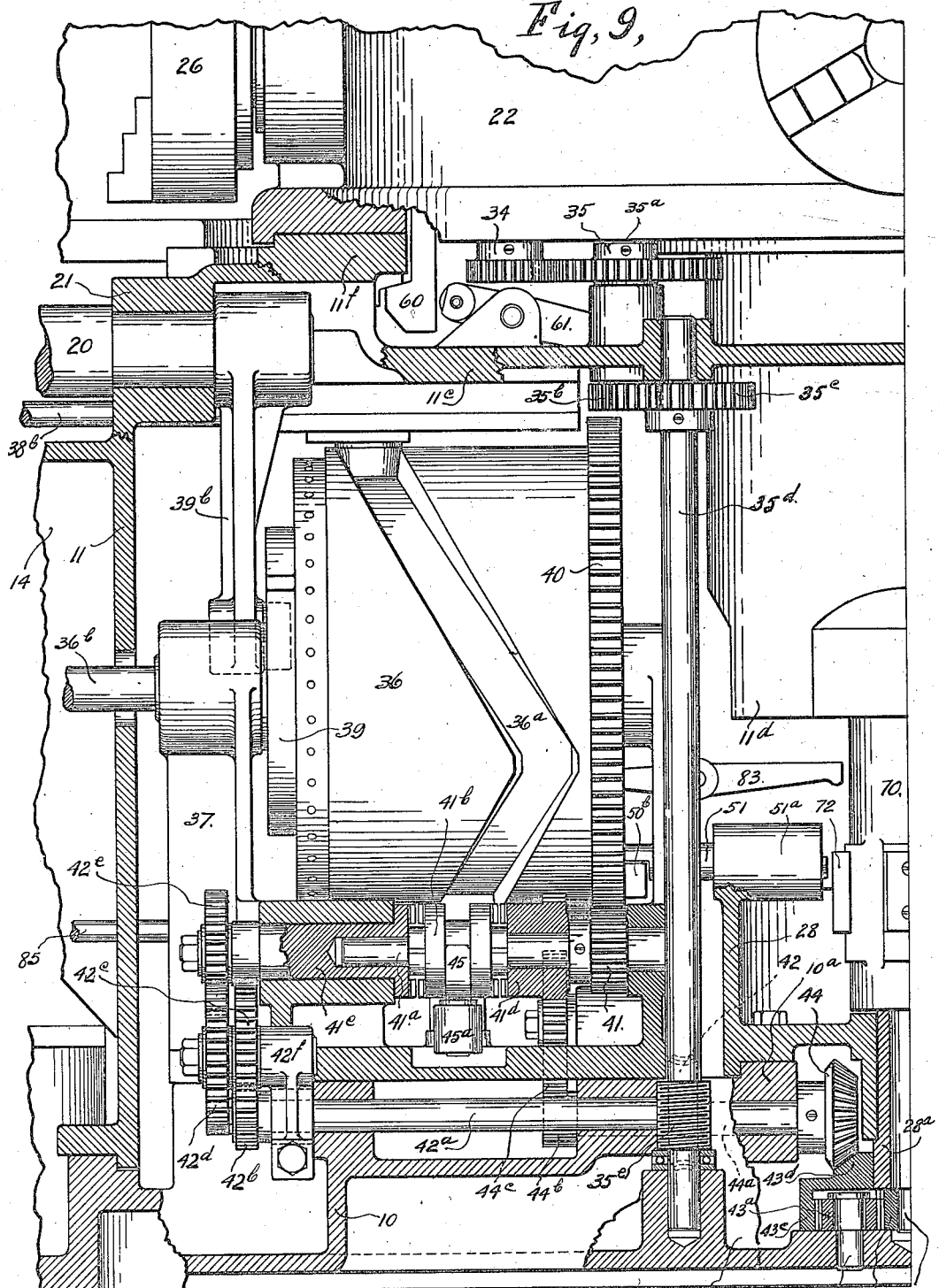

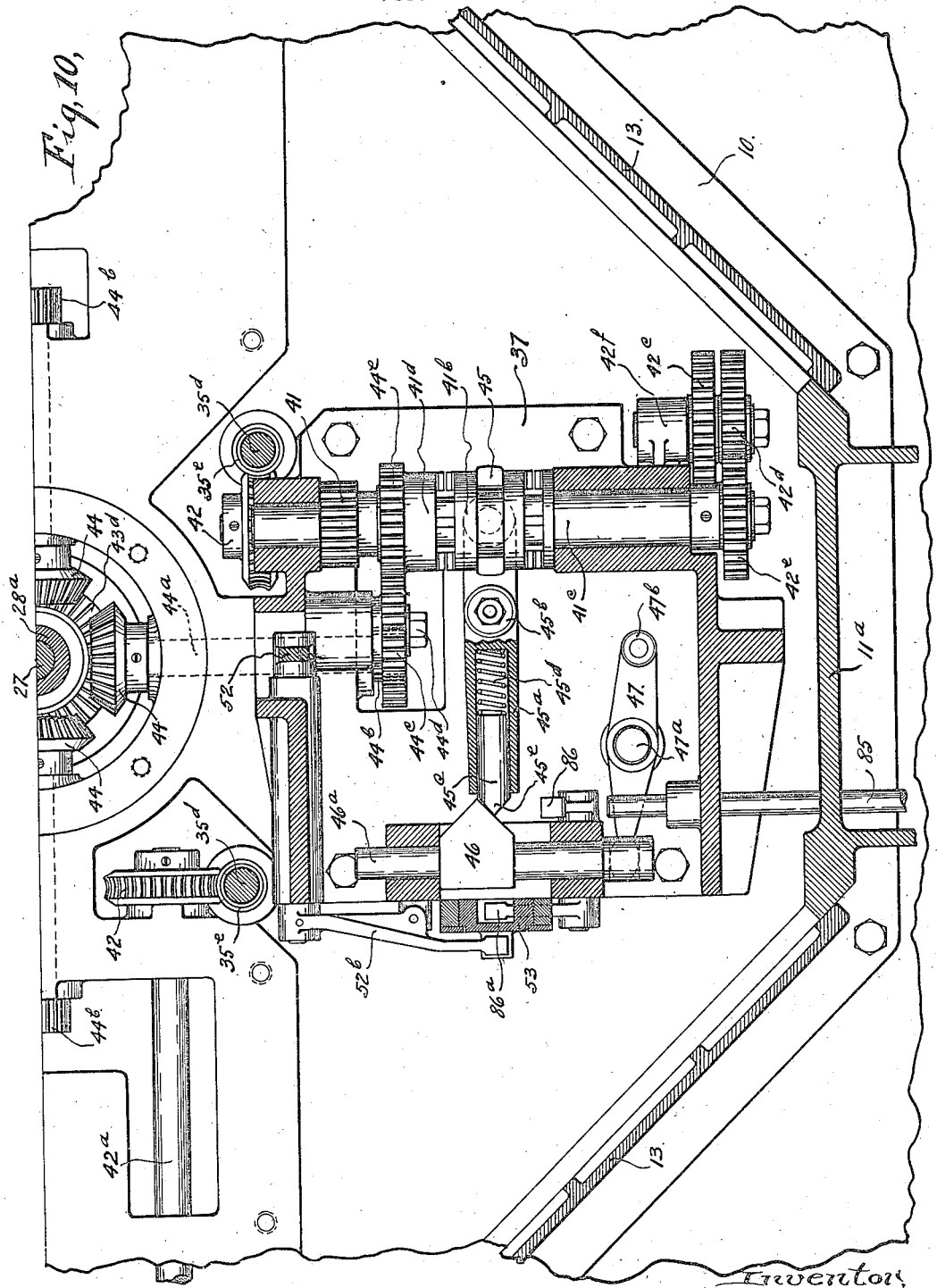

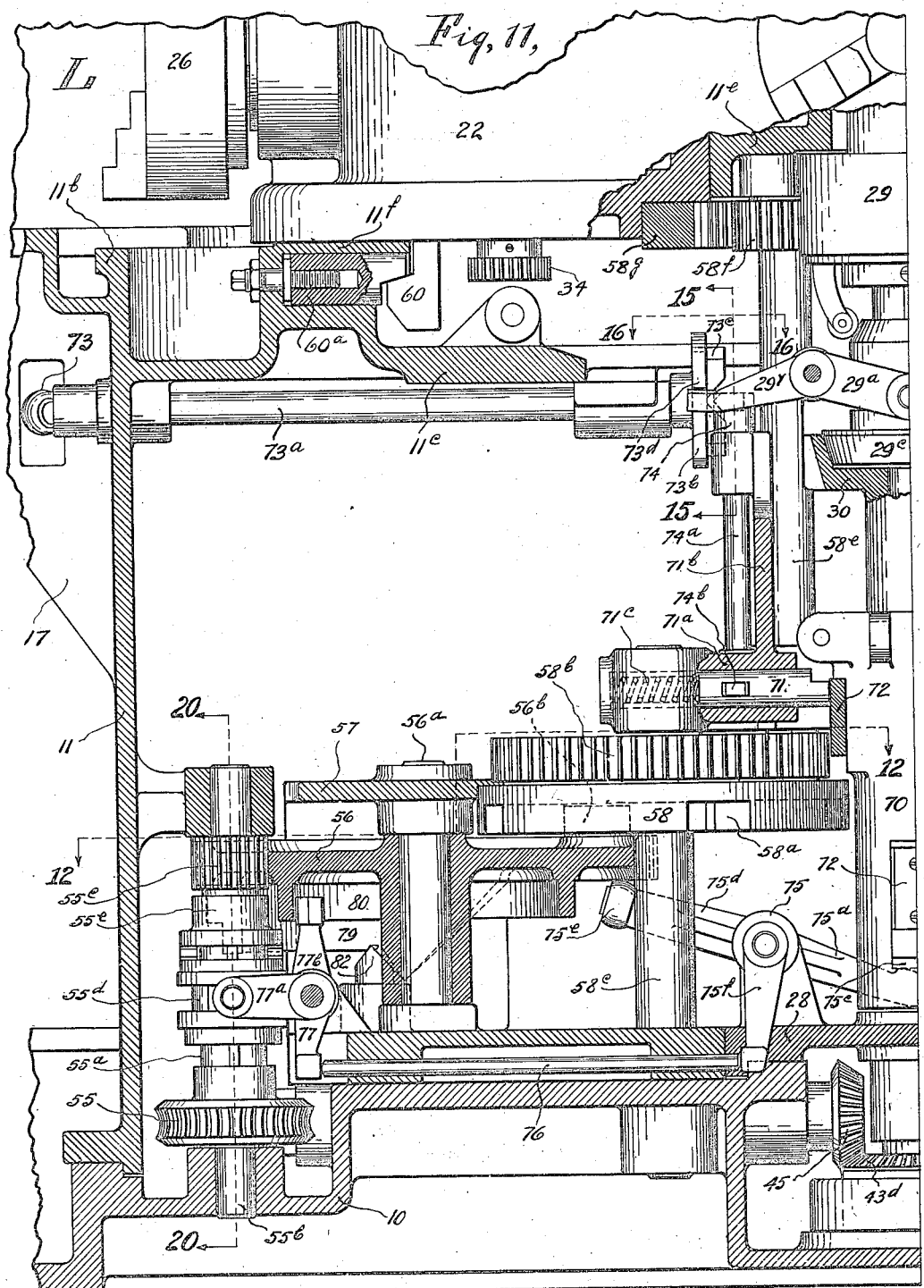

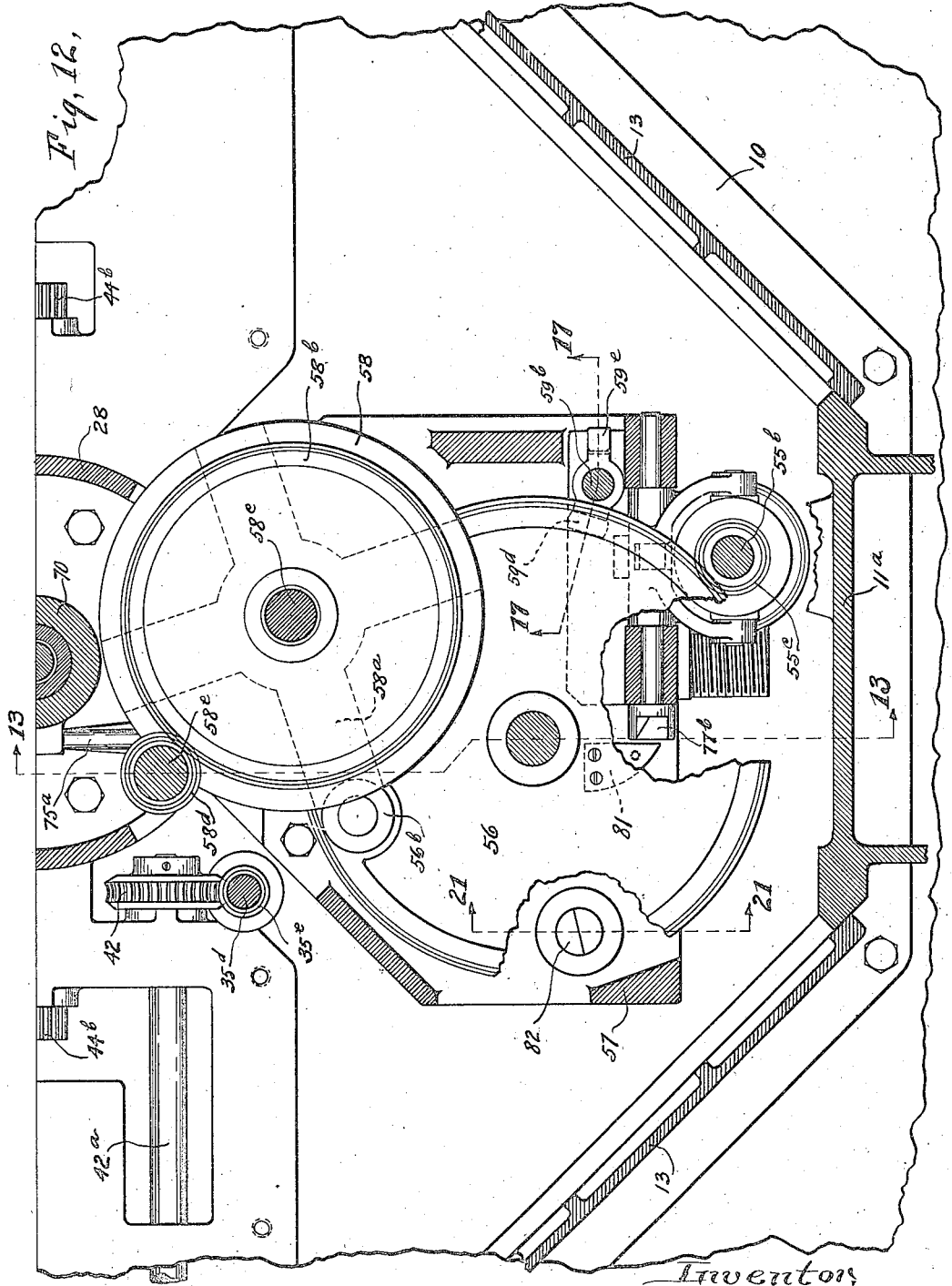

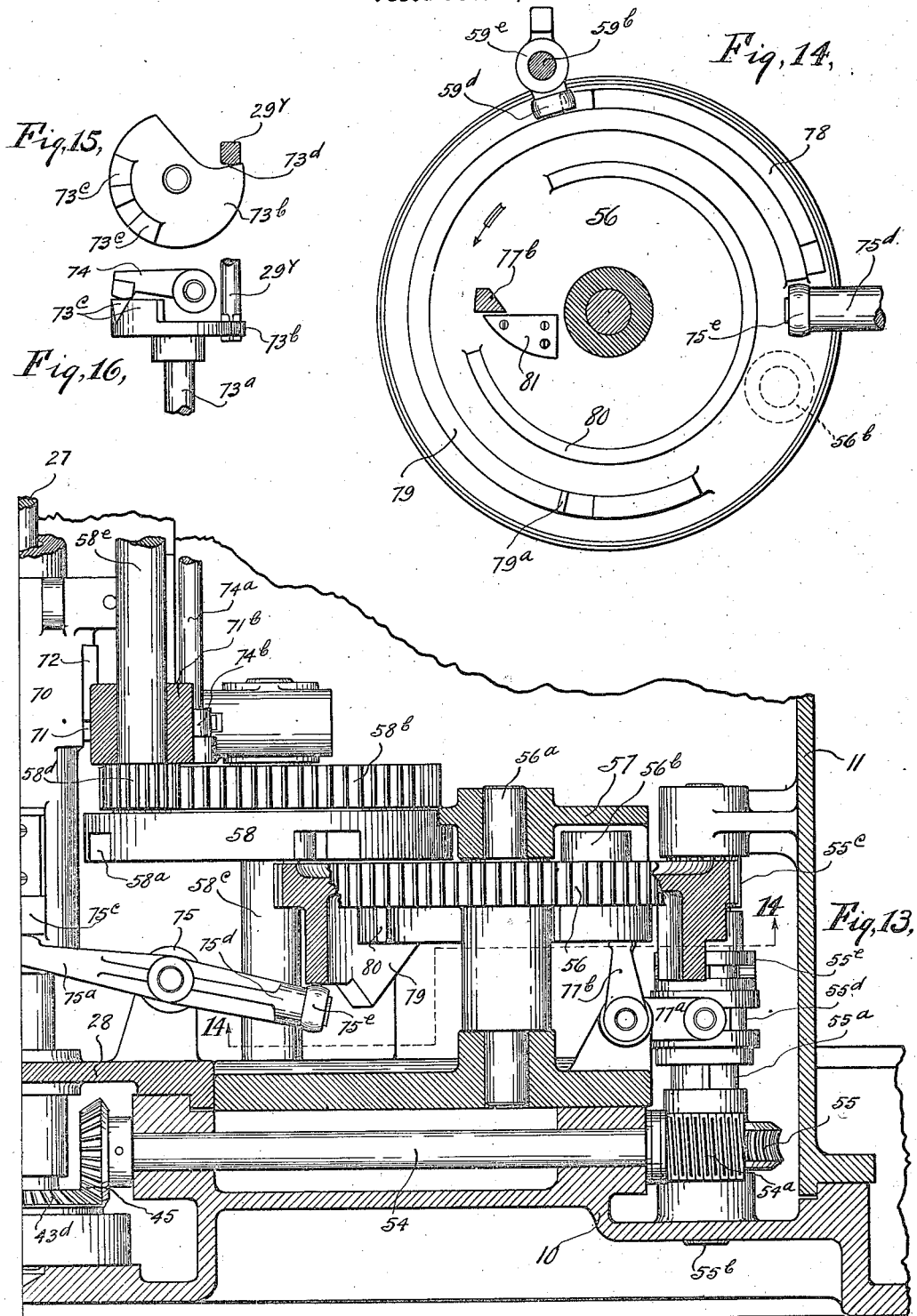

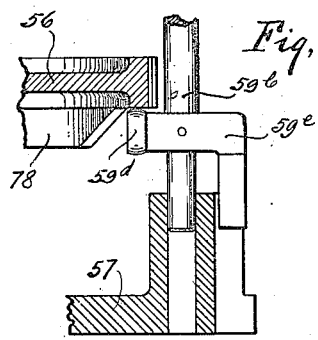
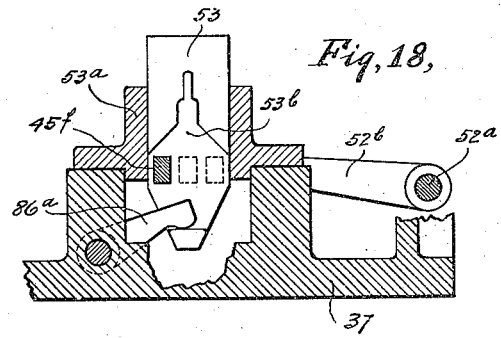
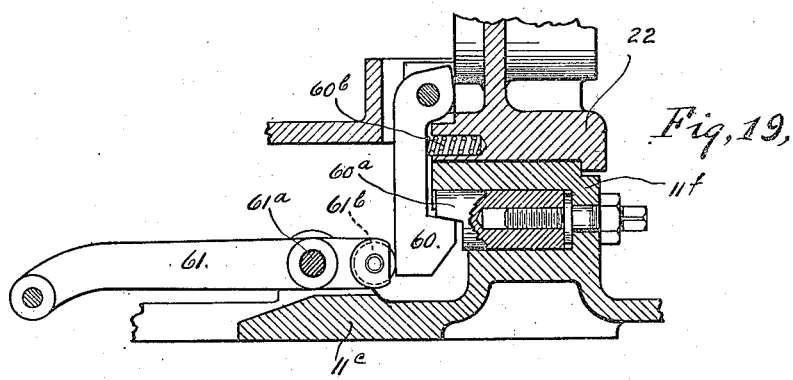
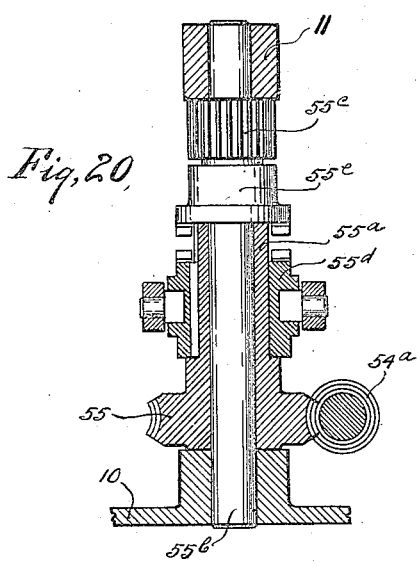
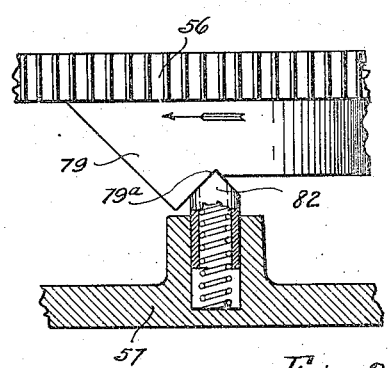

June 10, 1924.

J. J. N. VAN HAMERSVELD

AUTOMATIC MULTIPLE SPINDLE CHUCKING MACHINE

Filed Feb. 8, 1922   15 Sheets-Sheet 15

1,496,794

Patented June 10, 1924.

1,496,794

UNITED STATES PATENT OFFICE.

JOHN J. N. VAN HAMERSVELD, OF CLEVELAND, OHIO, ASSIGNOR TO THE WARNER AND SWASEY COMPANY, OF CLEVELAND, OHIO, A CORPORATION OF OHIO.

AUTOMATIC MULTIPLE-SPINDLE CHUCKING MACHINE.

Application filed February 8, 1922. Serial No. 534,887.

*To all whom it may concern:*

Be it known that I, JOHN J. N. VAN HAMERSVELD, a citizen of the United States, residing at Cleveland, in the county of Cuyahoga and State of Ohio, have invented a certain new and useful Improvement in Automatic Multiple-Spindle Chucking Machines, of which the following is a full, clear, and exact description.

This invention relates to an automatic multiple spindle chucking machine, and is an improvement over the constructions disclosed in my prior applications No. 424,139, filed November 15, 1920, and No. 437,436, filed January 15, 1921.

The principal object of the present invention is to provide an efficient automatic multiple spindle chucking machine and one which is more satisfactory in construction and operation than those which have been used or proposed heretofore.

More specifically considered, the invention aims to provide a machine of this type having a capacity for the performance of many, preferably six working operations at the same time, and to accomplish this with a machine having a greater efficiency, covering a larger field of work, and having fewer parts and less complicated in design than prior machines having even less capacity.

Still further the invention aims to provide a machine of this character having a great deal less height than prior machines of this general type; which has a greater number of tool heads with a less number of working spindles; which has its work spindles arranged horizontally, rendering the machine more adaptable for continuous steady work and more suitable in many ways to the workmen; which permits the use of pilot bars to steady the cutting tools; which has the major portion of the operating mechanisms arranged in the lower part of the machine and accessible for adjustment and repairs; which is rigid in construction and compact, adapting it for convenient shipment in assembled condition; which is so constructed that the feed units for the different working stations and the indexing unit are readily accessible; which has provision for stopping the tool heads of any work station during the cycle of operation to adjust the tools and take trial cuts if desired without interfering with the tool heads of the other work stations and then release said tool heads so that that part of the cycle normally performed at the station in question can be completed before the indexing takes place; which has provision for imparting relatively fast and relatively slow movements to the tool heads so that relatively rapid movements can be imparted to the tools while they are approaching or receding from the work, and relatively slow cutting feeds with provision for automatically effecting a change from relatively high to relatively low speeds or vice versa; which has an improved and highly efficient automatically operated control to regulate the starting and stopping of the work spindles, movement of the tool heads and for the indexing mechanism including the provision of means wherein there may be continuous operation with regular repetitions of complete cycles of tool feeds at the different stations and indexing, along with means controllable by the operator for providing against the possibility of indexing until the necessary work of removing a finished piece and applying a new piece at the loading station has been completed.

The above and numerous other objects which will appear from the following description are attained by my invention, which may be here briefly summarized as consisting in certain novel details of construction, and combinations and arrangements of parts which will be described in the specification and pointed out in the appended claims.

Figure 2:
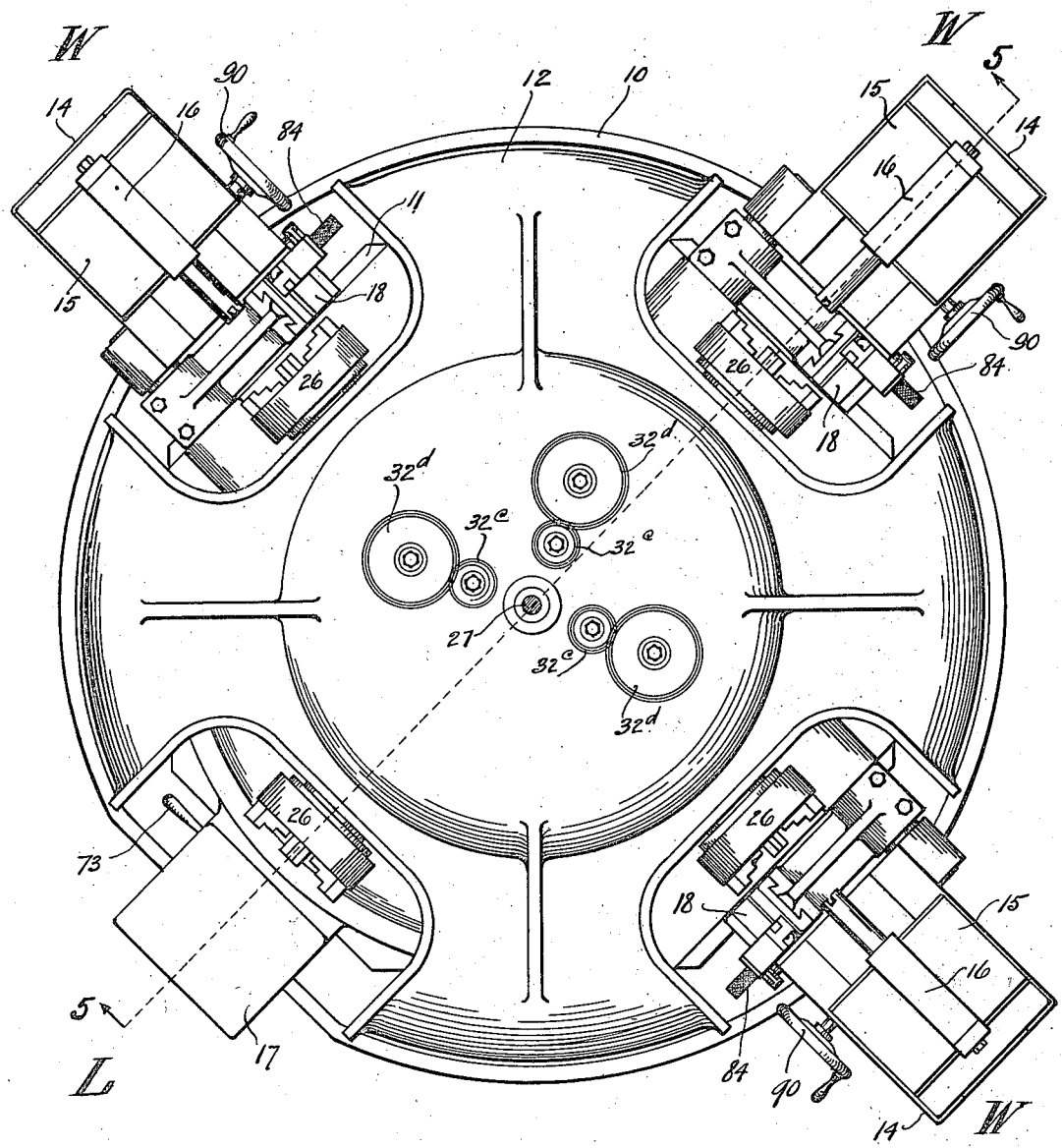
Figure 3:
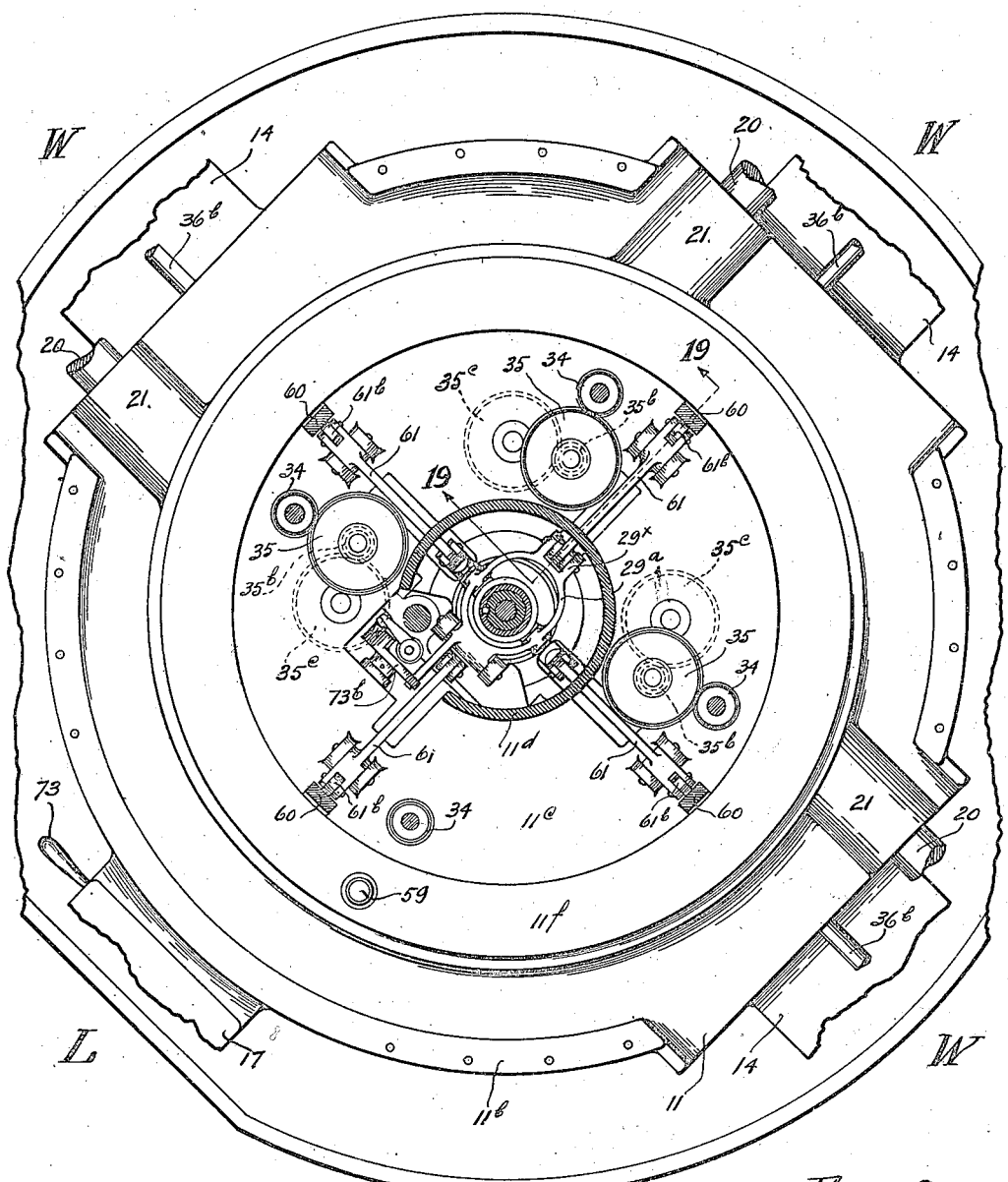
Figure 4:
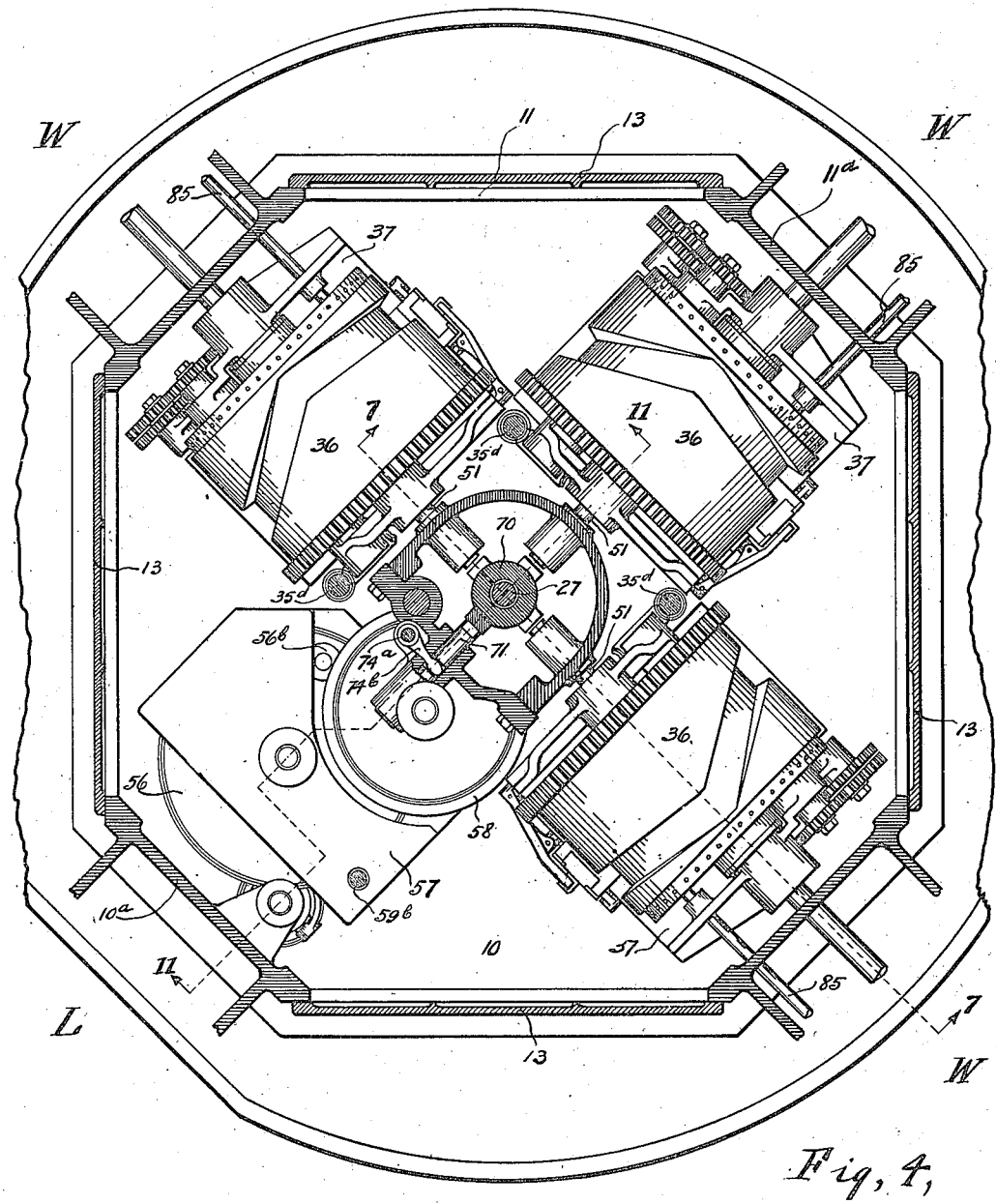
Figure 22:
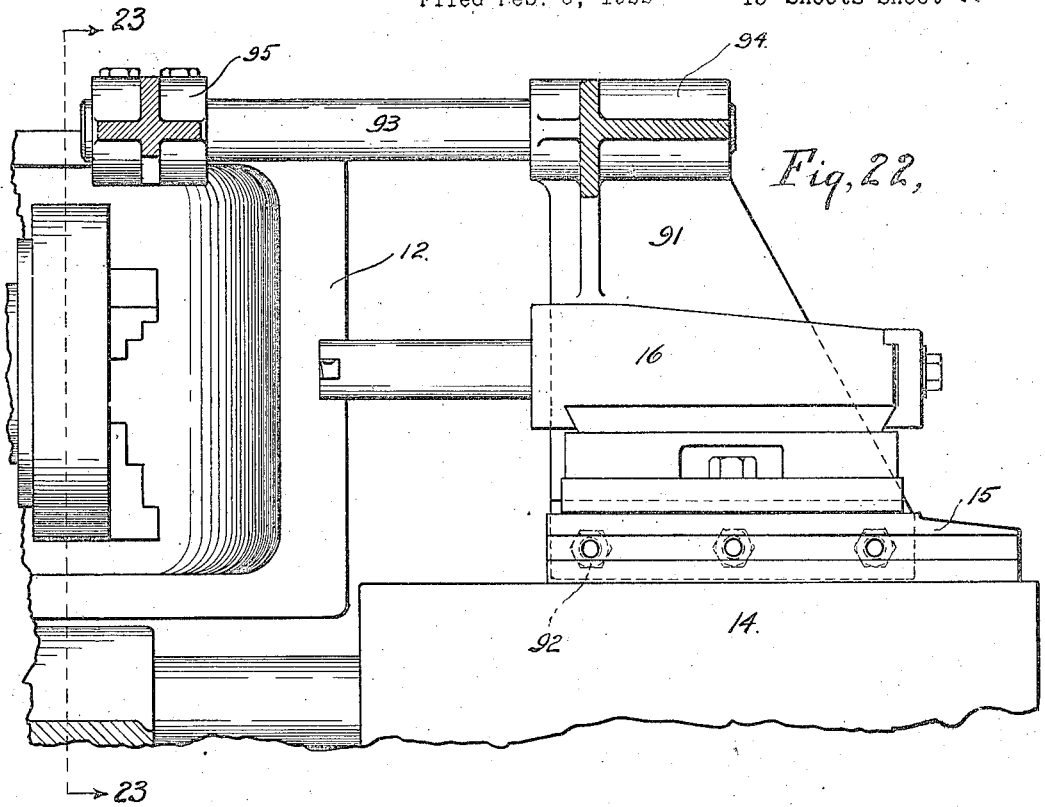
Figure 23:
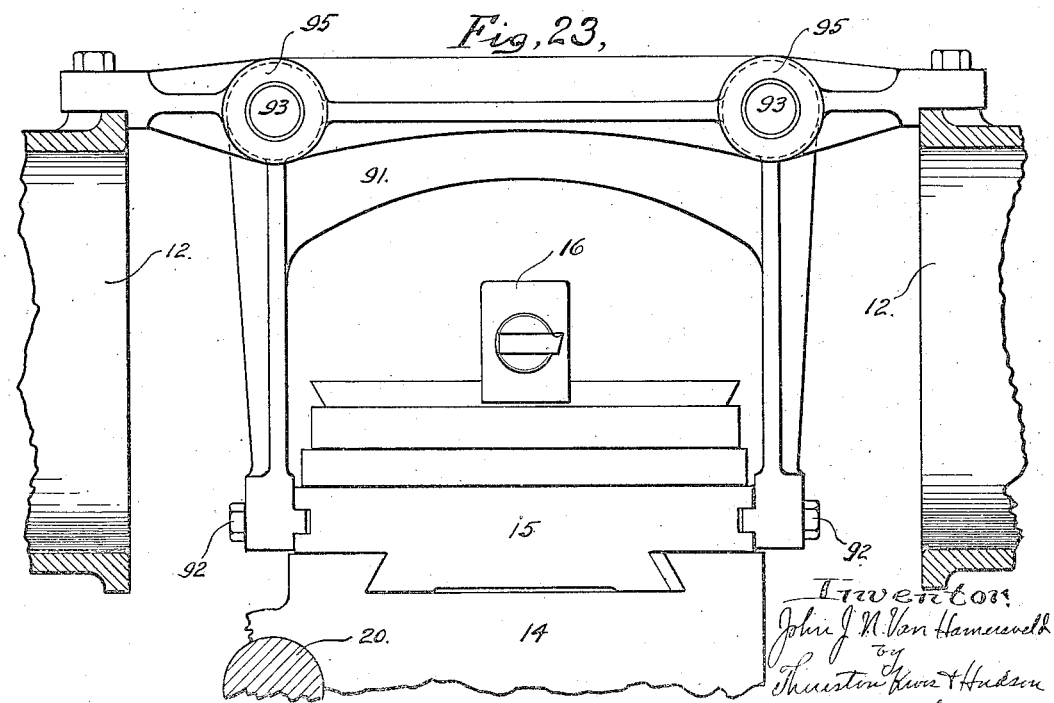

Fig. 1 is a side elevation of an automatic multiple spindle chucking machine embodying my invention; Fig. 2 is a top plan view of the same; Fig. 3 is a top plan view of the machine with the top cover and spindle carrier removed, and with certain parts in section substantially along the line 3—3 of Fig. 5; Fig. 4 is a sectional view substantially along the line 4—4 of Fig. 5; Fig. 5 is a vertical sectional view substantially along the line 5—5 of Fig. 2; Fig. 6 is a sectional view along the irregular line 6—6 of Fig. 5, showing the feed drum in elevation; Fig. 7 is a sectional view substantially along the line 7—7 of Fig. 4, omitting the upper part of the machine and showing the major portion of the feed mechanism in elevation, the parts shown being from the center of the machine to the outside of one of the work stations; Fig. 8 is a sectional view substantially along the line 8—8 of Fig. 6, with the feed drum shown in elevation, also partly along the line 8ª—8ª of Fig. 5; Fig. 9 is a sectional view substantially along the irregular line 9—9 of Fig. 8, showing the feed drum in elevation; Fig. 10 is a horizontal sectional view substantially along the irregular line 10—10 of Fig. 8; Fig. 11 is a vertical sectional view showing particularly the indexing mechanism, the section being from the center of the machine out to the outer side of the loading station, the section being taken substantially along the irregular line 11—11 of Fig. 4; Fig. 12 is a horizontal sectional view through the indexing mechanism, the section being taken substantially along the irregular line 12—12 of Fig. 11; Fig. 13 is a vertical sectional view of the indexing mechanism, the section being taken substantially along the irregular line 13—13 of Fig. 12; Fig. 14 is a view looking toward the under side of a Geneva motion gear constituting a part of the indexing mechanism, a portion being in section along the line 14—14 of Fig. 13; Fig. 15 is a face view of a part of the operator's controlling mechanism with an associated arm in section, substantially along the line 15—15 of Fig. 11; Fig. 16 is a plan view of the same, looking down from the line 16—16 of Fig. 11; Fig. 17 is a detail sectional view substantially along the line 17—17 of Fig. 12, showing particularly the manner of guiding the lower end of the spindle carrier lock bolt; Fig. 18 is a sectional view substantially along the line 18—18 of Fig. 8, showing a portion of the tool head controlling means; Fig. 19 is a detail sectional view substantially along the line 19—19 of Fig. 3, showing particularly one of the spindle carrier clamping units; Fig. 20 is a sectional view substantially along the line 20—20 of Fig. 11 showing a portion of the operating means for the indexing mechanism; Fig. 21 is a view partly in section and partly in elevation, the section being taken substantially along the line 21—21 of Fig. 12; Fig. 22 is a detail sectional view showing a portion of one of the work stations with the work spindle and chuck in operative relation thereto, this view showing a modification involving the use of one or more pilot bars to steady the tool slide; and Fig. 23 is a sectional view substantially along the line 23—23 of Fig. 22.

By reference to Fig. 1 it will be observed that the machine occupies very little head room and that the over-all height of the machine is small as compared with other multiple spindle chucking machines wherein the spindles and slides are vertically arranged. Likewise the floor space compares very favorably with the floor space of the multiple spindle chucking machines of the type or design just referred to.

The base of my improved machine is substantially annular and the projected floor space is substantially rectangular, due to the portions extending out at the work and loading stations, this being apparent from Fig. 2.

The machine in itself includes a base 10, designed to rest on the floor, and including a pan shaped peripheral portion. On this base is mounted a main stationary frame member 11 which is in the form of a vertically disposed hollow casting which encloses the feed and indexing units. Secured to the top of the frame casting 11 is a stationary top or cover 12 which encloses the spindles and spindle carrier. The body of the frame or casting 11 is substantially octagonal in shape, as will be seen by reference to Fig. 4, and it includes alternately disposed fixed or integral portions 11ª, and removable doors 13 normally covering or closing openings in the frame by which access may be had to the feed and indexing units, each being accessible from either side thereof, as will be readily apparent by reference to Figs. 1 and 4. In Fig. 3 the cover 12 and the parts which rotate within the cover on the top of the frame member 11, and consisting of the spindle carrier and spindles are removed, this view therefore showing the shape of the upper portion of the frame member 11.

In the machine designed by me and constituting the subject matter of this application, provision is made for six tool holders, all capable of simultaneous operation, but this is accomplished with a design having only four work spindles and three work stations and one loading station, this being accomplished by providing two tool heads, one for a drilling, boring or turning operation and the other for a facing operation at each work station. It is to be understood, however, that the number of work stations and the number of work spindles may be increased or decreased, and that I am not to be confined to three work stations and four spindles herein shown. In the drawing I have designated the work stations by the reference letter W, and the loading station by the reference letter L.

By reference to Fig. 2 it will be observed that the three work stations and the loading station are spaced equal distances apart around the frame member 11, these stations therefore having an angular spacing of 90°. In Fig. 1 the loading station is at the center, facing the observer, and two of the three work stations are seen at opposite ends of the figure, while in Fig. 5 are shown one work station and the loading station.

By reference particularly to Figs. 1, 2 and 5 it will be seen that at each work station W the frame member 11 has a laterally projecting slide support 14 on which is mounted a horizontally and radially movable slide 15 carrying a tool head 16 for a cutting tool. At the loading station there is a somewhat shorter extension 17 constituting a table or platform to facilitate removal of the finished work piece and the placing of a new work piece in the chuck of the working spindle which is opposite the loading station. The second tool head which is provided at each work station is best shown in Fig. 8, where it is designated by the reference character 18, this tool head being adapted to receive a facing tool and being supported on an arm 19 secured on a rock shaft 20 journaled in a bearing 21 (see Figs. 3 and 9), which bearing is adjacent the top of the frame member 11 inward of the slide support 14 and at one side thereof, and supports the rock shaft so that the tool head 18 will swing in a plane at right angles to the path of movement of the tool slide 15.

The mechanism for operating the tool heads of the several stations at relatively high speed when the tools are approaching or receding from the work, and at relatively low speed while the tools are cutting, and the means whereby the speed change is automatically effected, will be subsequently explained.

The frame member 11 is provided with an outer flanged top portion $11^b$ to which the cover 12 is designed to be bolted, this portion being annular in contour, though interrupted at the working stations and forming a gutter to carry off the cutting lubricant (see Fig. 5). Just beneath the flanged top portion $11^b$ the frame member 11 is provided with a transverse head portion or partition $11^c$ which extends horizontally inward toward the center and terminates in a central upright hub-like portion or column, partly located beneath the head or partition $11^c$ in the form of a depending skirt $11^d$, and partly above the partition, this part being designated $11^e$ and constituting a centering means for the rotary spindle carrier and assisting in the support of the drive shaft and a sleeve mounted thereon, as will be described shortly.

The partition or transverse head $11^c$ of the frame member 11 is provided inside the outer top portion $11^b$ with an upstanding annular track or guide-way $11^f$ for the spindle carrier. This guide-way is clearly shown in Figs. 3 and 5, and some of the detail views.

Supported on this guide-way to rotate about a vertical axis is a spindle carrier 22 having an outer annular portion shaped to engage the top of the guide-way $11^f$ and provided adjacent the center with a hub $22^a$ which is centered on the upstanding hub portion $11^e$ of the transverse head or partition $11^c$ of the frame member 11 through the medium of a tapered centering ring 23 pressed down against the inner tapered face of the spindle carrier hub $22^a$ by a nut 24 screwed onto and locked to the upper end of the frame hub $11^e$.

This spindle carrier has bearings for rotatably supporting four work spindles 25 which are horizontally and radially disposed, and are provided at their outer ends with work holding chucks 26 of any suitable design.

The manner in which this spindle carrier is indexed or moved step by step to shift the work spindles successively to the different work and loading stations, and the devices for locking the spindle carrier and holding it firmly against movement between its 90° indexing movements will be explained shortly. But it may be noted in passing, that the horizontal and radial arrangement of the tool slides and work spindles does away with the necessity of a large central tool slide supporting column, required with multiple spindle chucking machines having vertically arranged tool slides and work spindles.

The machine is provided with a main operating shaft 27 which extends vertically and centrally of the machine from top to bottom thereof. This shaft, which is driven at a constant high speed may be belt driven or motor driven in any desired manner, but a direct motor drive is preferred, in which event a vertical motor, (not shown) will be mounted in the center on the stationary top or cover member 12 directly above the shaft 27 and with its shaft vertically disposed and coupled to the driving shaft 27. The shaft 27 is rotatably supported by the top or cover 12, and at its lower end is journaled in a casting 28 supported by and secured to the center of the base 10, the latter having a well $10^a$ into which the lower part of the shaft extends, for a purpose to be subsequently explained.

The shaft 27 is provided with a clutch 29 (see Fig. 5) which controls the work spindle drives. Though any suitable type of clutch may be employed, a friction disk clutch is preferred. This clutch, which is automatically operated in the manner hereinafter described, is operated by a clutch shifting lever $29^a$, pivotally supported at $29^b$ on a stationary member or bracket 30 through which the shaft extends and is journaled as shown in Fig. 5, the bracket being secured to the lower part or skirt $11^d$ of the column of the casting member 11. This clutch shifting lever $29^a$ engages with a clutch shifting member $29^c$ keyed and slidably mounted on the outer member of the clutch 29, and having a cone-shaped lower end which will act as a brake when by the disengagement of the clutch 29 said member 29° is forced into a stationary brake seat formed at the top of the bracket 30, as clearly shown in Fig. 5.

The outer member of clutch 29 is carried by a sleeve 31 which extends upwardly around the shaft 27. The upper part of this sleeve is provided with a central gear 32, constituting a driving gear for the work spindles 25. Three gear trains are provided for simultaneously operating three of the four work spindles which are at the work stations, the fourth spindle at the loading station being then idle, and each of these trains includes a gear 32ª (see upper part of Fig. 5) mounted on the bottom of a vertical shaft indicated at 32ᵇ, which shaft is supported by the cover 12 and is provided at its outer end above the cover with a gear 32ᶜ meshing with a gear 32ᵈ at the top of a shaft similar to shaft 32ᵇ, and likewise supported by the cover 12, this shaft being provided at its lower end with a gear 32ᵉ.

The gears 32ᵉ of the three gear trains are adapted to engage and rotate additional spindle driving parts which are mounted on and rotate with the spindle carrier 22. These parts carried by the spindle carrier include gears 33, one associated with each working spindle 25 and adapted to roll into and out of driving engagement with the gears 32ᵉ as the spindle carrier is indexed. These gears 33 are mounted on the upper ends of vertically disposed shafts 33ª, each rotatably supported by the spindle carrier 22 alongside one of the work spindles 25, and each in this instance being provided with a worm 33ᵇ (see left hand side of Fig. 5) engaging and adapted to rotate a worm wheel 33ᶜ (see right hand side of Fig. 5) secured to the corresponding work spindle 25.

As before stated, there are three gear trains composed of the parts 32ª to 32ᵉ, all driven by the central gear 32, the arrangement of these gear trains being apparent from Fig. 2, and it will be seen also that at the start of the indexing movements the gears 33 movable with the spindle carrier roll out of engagement with the gears 32ᵉ and just before the completion of the indexing movement the gears 33 associated with three of the working spindles roll into mesh with the gears 32ᵉ of the three gear trains referred to, so as to establish driving relationship with the work spindles which are in line with, or opposite the work stations. Likewise it will be understood that after each indexing movement and when the clutch 29 is thrown in, the three work spindles at the work stations will be simultaneously rotated at a constant speed by the described spindle driving mechanism, but the spindles may be driven at different speeds by changing the ratio of the pairs of gears 32ᶜ and 32ᵈ of the three gear trains. The pairs of gears 32ᶜ and 32ᵈ, which may be termed change gears, are placed outside of the cover 12 so that they may be readily replaced with gears of a different ratio in order that the speed of the work spindles may be varied if desired.

It might be here stated that the vertical shafts 33ª associated with the work spindles and constituting a part of the spindle driving means, are utilized also for imparting the relatively slow or feed motion to the tool heads at the different work stations. They are therefore provided at their lower ends with gears 34 which roll out of and into mesh with companion gears 35 (see Fig. 5) of the tool feed drives at the start and completion respectively of the indexing movements of the spindle carrier. The gears 32ᵉ and 33 and the gears 34 and 35 are cut with special teeth having no flat on their outer edges or peripheries in order that they may roll into mesh properly.

Taking up next the means for operating and controlling the tool heads at the different work stations, it will be recalled that the tool heads are given a relatively slow feeding movement, i. e. when the tools are cutting, and a relatively fast movement when the tools are approaching with the work prior to the actual working operations and while they are receding from the work after the completion of the cutting operations or work thereon. The mechanism for shifting the tool heads at the relatively fast and relatively slow speeds and for effecting the change from one speed to the other, and for otherwise controlling the movements of the tool heads will now be explained.

Associated with and located at the different work stations are what may be termed feed units located inside the frame member 11, just inwardly with respect to the tool slide supports 14. The relative arrangement of the feed units is very clearly seen from Fig. 4 as well as their arrangement with respect to the indexing unit.

Each feed unit includes a barrel type drum 36 adapted to rotate about a horizontally and radially disposed axis, the axes of the drums being directly beneath the axes of the work spindles when they are in working position. Each drum 36 is supported in bearings of a feed unit fixture 37, each fixture being in the form of a casting supported on the base 10 of the frame (see Fig. 7) and comprising a bottom portion 37ª resting on and secured to an appropriate portion of the base 10 and upright end portions or webs 37ᵇ terminating at the top in bearings 37ᶜ in which the drum is journaled. Each fixture 37 supports in addition to the drum various parts of the controlling mechanism for the tool head operating means.

The drum is provided on its periphery with a continuous cam groove 36ª, the top of which is engaged by a roller 38 on a slide 38ª guided for in and out movement by a suitable part of the frame member 11, this slide having a rod 38ᵇ which extends outwardly and is connected in any suitable manner to the tool head 15 so that the movement of the slide 38ª which is actuated by the drum will be imparted to the tool head 15.

At the outer face of the drum there is a face cam 39 (see particularly Fig. 8), and this face cam is engaged by a roller 39ª on an arm 39ᵇ secured to the rock shaft 20, which shifts the facing tool head 18 forming one of the two tool heads at each work station as already explained. Obviously as the drum 36 is rotated through a complete revolution the tool slide 15 will be given one complete cycle of inward and outward sliding movement, and the tool head 18 will be moved through one complete cycle of rocking movement toward and from the work piece. It will be apparent also, that the rates at which the two tool heads are moved will depend upon the speed of the drum 36 and the changeable face cam 39.

For rotating the drum the latter is provided at its inner end with a gear 40, which is engaged by a driving pinion 41, best shown in Figs. 9 and 10, this pinion being located beneath the drum and somewhat to the side of the fixture 37. As will be observed from Fig. 9 the pinion 41 is secured to a shaft 41ª on which is keyed an intermediate slidable clutch member 41ᵇ adapted when shifted in one direction to be positively clutched to a relatively slow speed driving member 41ᶜ and when shifted in the opposite direction to a relatively high speed driving member 41ᵈ. The slow speed driving member 41ᶜ is in the form of a shaft which receives the end of the shaft 41ª, and both shafts are journaled in bearings carried by the upright ends or webs of the corresponding feed unit fixture 37. The slow speed driving members 41ᶜ of the different feed units are operated by the work spindle driving shafts 33ª and therefore through the gears 34 on the lower ends of these shafts 33ª, and the gears 35 which are driven by the gears 34 as previously explained, roll into and out of engagement with the gears 34 when the work spindle carrier is indexed.

As will best be seen by reference to Fig. 3 and Fig. 9 the gear 35 associated with each feed unit is mounted on a short vertical shaft 35ª carried by the head or partition 11ᶜ of the member 11, and beneath this partition this shaft is provided with a pinion 35ᵇ which engages a gear 35ᶜ on a vertical shaft 35ᵈ journaled in the head 11ᶜ of the frame member 11 and in the base of the frame as clearly shown in Fig. 9. Near its lower end this shaft 35ᵈ has a worm 35ᵉ cut on it (see Fig. 9) and this worm is engaged by a worm wheel 42 on a horizontal shaft 42ª extending toward the front of the feed unit alongside and beneath the associated drum 36. A set of compounded change gears is utilized to transmit movement from this shaft 42ª to the relatively low speed driving member 41ᶜ, and this set includes a gear 42ᵇ (see particularly Fig. 9) on the shaft 42ª, two gears 42ᶜ and 42ᵈ which rotate in unison, and a gear 42ᵉ mounted on the slow speed driving member 41ᶜ, which as before stated, is adapted to be positively clutched to the intermediate clutch member 41ᵇ. The gears 42ᶜ and 42ᵈ are carried by an adjustable arm 42ᶠ, shown in Figs. 8 and 9. Thus it will be seen that when clutch member 41ᵇ is shifted to the left as the same is viewed in Fig. 9, the drum 36 of the feed unit will be turned at the relatively low speed which is utilized for the feed of the tools when working.

The relatively high speed is imparted to the drums of the three feed units from the lower end of the main drive shaft 27 and independently of the work spindle drive mechanism. By reference to Fig. 9 it will b observed that at the lower end of the drive shaft 27 there is a pinion 43. This pinion drives a number of idler pinions 43ª (one only shown in Fig. 9) mounted on the pins 43ᵇ supported in the lower part of the base casting 10 near the center thereof, these pinions and the parts associated therewith being in the well 10ª already referred to. The idler pinions 43ª drive an internal gear 43ᶜ which is journaled on the lower end of a downwardly extending hub 28ª of the casting 28 already referred to, which casting is carried by the central part of the base 10ª and forms a bearing for the lower part of the main drive shaft as previously explained. The internal gear 43ᶜ has formed on the upper part thereof a bevel gear 43ᵈ which is engaged by four equally spaced bevel gears, three of such gears 44 being utilized for imparting the relatively quick motion to the feed drums and therefore to the tool slides, and to the fourth bevel gear designated 45 forming a part of the indexing drive mechanism, as shown in Fig. 5.

By reference particularly to Figs. 5, 9 and 10 it will be observed that each of the gears 44 is mounted on the inner end of a horizontally and outwardly extended shaft 44ª journaled in the base casting 10, and that on the outer end of the shaft 44ª there is provided a spur gear pinion 44ᵇ (see Figs. 8, 9 and 10) which meshes with an idler gear 44ᶜ supported on a pin 44ᵈ on the feed unit fixture 37, this gear 44ᶜ meshing with a gear 44ᵉ forming a part of the relatively high speed driving member 41ᵈ adapted to be clutched to the intermediate clutch member 41$^b$ of the unit. Thus it will be seen that when the intermediate clutch member 41$^b$ is thrown to the right as the same is viewed in Fig. 9, the drum 36 of the feed unit will be rotated at a relatively high speed.

For the purpose of automatically controlling the intermediate clutch member 41$^b$ so that it may be thrown into engagement with the high speed driving member 41$^d$, or low speed driving member 41$^c$, or to be disengaged from both and held in neutral position, this intermediate clutch member 41$^b$ is moved by a shifting fork 45 mounted on one end of a lever 45$^a$ which is pivoted at 45$^b$ to the bottom or base of the feed unit fixture 37 beneath the drum and substantially transversely to its axis. As will be observed from Fig. 10, the lever 45$^a$ is provided at its end opposite to that carrying the fork 45 with a so-called spring point 45$^c$ consisting of a pin slidable axially of the lever in a socket and movable inwardly compressing a spring 45$^d$ in the socket, the outer end of the pin having a tapered point 45$^e$. The opposite tapered faces of this point are adapted to engage the opposite tapered faces of a so-called spring point block 46 on a slide 46$^a$ slidingly supported in a part of the feed unit fixture 37. Obviously the movements of the block 46 in opposite directions will act on the spring point 45$^c$ so as to throw the intermediate clutch member in opposite directions.

One end of the slide 46$^a$ is engaged by one end of a lever 47 which shifts the slide and spring point block and which is pivoted intermediate its ends at 47$^a$ to the base of the fixture 37. The other end of this lever (see Fig. 7) carries a roller 47$^b$ which is adapted to be engaged and shifted alternately by two dogs 48 and 49 which are carried by the feed drum so as to change the speed of the drum from relatively fast to relatively slow and from relatively slow to relatively fast respectively. Both dogs are provided with roller engaging ends 48$^a$ and 49$^a$ which are tapered in opposite directions to shift the roller 47$^b$. The movement thus imparted to the roller 47$^b$ and the slide and spring point block shifting lever 47 is sufficient to cause the intermediate clutch member 41$^b$ to be shifted from one driving position to the other.

The dog 48 is adjustable and is adapted to be secured onto the reduced outer end of the drum by a bolt 48$^b$ passing through an elongated slot of the dog as clearly shown in Fig. 7, and adapted to be extended through any one of a series of threaded holes 48$^c$ provided at the end of the drum. This dog is instrumental in changing the speed of the drum from the relatively high to the relatively slow, and comes into action after the tools are brought up close to the work with the relatively fast speed. The dog 49 is preferably fixed to the drum, this dog being instrumental in changing the speed of the drum from the relatively slow to the relatively high, and comes into action immediately after the tools have completed their cutting on the work piece.

In operation, the main tool slide 15 and facing tool head 18 will advance with quick motion until a point is reached where the tools mounted on the tool heads will start feeding, or move with a relatively slow movement when the adjustable dog 48 comes into action and changes the speed of the drum to the relatively slow speed, by causing the intermediate clutch member to be disengaged from the high speed driving member and to be thrown into engagement with the low speed driving member. As soon as the feed or slow speed is completed, the tool heads will be held stationary for a brief period to relieve the tools from any springy action, and then the fixed dog causes the intermediate clutch member to be thrown into engagement with the high speed driving member, causing the tool heads to return with a constant quick motion to their former positions. At this point it is desirable that the drum and slide movements be stopped until the beginning of the next cycle of movement at the work station. To accomplish this, the inner face of the drum is provided with a slide 50, (see Fig. 7) capable of slight radial movement against the action of a spring 50$^a$. This slide carries a dog 50$^b$ so disposed that when the drum has almost completed one revolution, the tapered face of the dog will engage one end of a controller lock pin 51 which is slidably mounted for in and out or radial movement in a boss 51$^a$ forming a part of the lower central casting 28. This slidable controller lock pin 51 has connected to it the upstanding arm 52 of a bell crank pivoted at 52$^a$ on the fixture 37, the bell crank having a substantially horizontally disposed arm 52$^b$ which is normally pressed upward by a spring 52$^c$, and at its free end is adapted to engage a slide 53 mounted in a vertically disposed slideway 53$^a$ carried by the fixture 37, this being illustrated in Figs. 5 and 7. This slide, which as will be apparent from Figs. 6 and 8, is mounted opposite the lever 45$^a$ carrying the fork 45 for shifting the intermediate clutch member. This lever 45$^a$ has an extension 45$^f$ which projects over and beyond the spring point 45$^e$ and enters a recess 53$^b$ in the adjacent face of the slide 53 (see Fig. 18). The slide is normally held upward by a spring 53$^c$, here shown as located in the slide and engaging a pin 53$^d$ of the guideway or supporting bracket for the slide (see Fig. 8) and when the slide is elevated the recess receiving the free end of the lever extension 45$^f$ does not interfere with the stroke of this lever 45$^a$ by the spring point block on the slide 46$^a$ when actuated by the lever 47 and the dogs 48 and 49 on the drum. However, when the slide is lowered, the upper tapered part of the recess 53$^b$ shifts the lever 45$^a$ so as to bring the intermediate clutch member to neutral position, whereupon the movement of the drum is stopped. Thus it will be seen that when the drum has almost completed one revolution during which the tool heads have been advanced to the work, the cutting has been completed, and the tool heads have been returned almost to their former position, the dog 50$^b$ carried by the drum pulls the controller lock pin 51 outward, rocking the bell crank having its two arms 52 and 52$^b$, and this rocking movement of the bell crank lowers the slide 53, causing the disengagement of the clutch 41$^b$ with the fast driving member 41$^d$ which it previously engaged, and bringing the intermediate clutch member to neutral position. It should be noted that the drum is now completely locked as the dog 50$^b$ is engaged with the controller lock pin 51, and prevents the movement of the bell crank 52, 52$^b$ and the slide 53, and that said slide 53 holds the clutch shifting lever 45$^a$ in a nearly central position and this in turn holds the intermediate clutch member in neutral position.

It will be understood that the mechanism or unit described for operating the tool heads is duplicated at each working station, and that the cycle of movement described will take place at each of the three work stations, though the start of the feed or slow motion and the start of the relatively quick return motion imparted to the tool heads, and the completion of the movement and stopping of the drums may take place at different times, depending upon the adjustments which may be given to the adjustable slow movement or feed controlling dogs 48 of the several drums, and the possible different rates of speed of the drums while engaged in slow motion.

The controller lock pin 51, one of which is, of course, provided for each working station, and which was referred to above in the description of the construction and function of the controlling mechanism for the drum, has a very important co-operation with, and function in connection with a controller slide to be referred to presently.

Having described the manner in which, and the mechanism by which the work spindles, and the tool slides are operated, and their movements controlled, I wish at this point to rather briefly refer to the indexing mechanism for the spindle carrier and later describe certain parts of this mechanism in a more detailed manner.

The indexing unit as already stated, is located in the frame member 11, and this unit, as will be observed from Fig. 4, occupies the same position with respect to the loading station L as do the feed units with respect to the work stations W, the indexing unit being accessible from either side, the same as the parts of the feed units.

As already explained, the constant speed bevel gear 43$^d$ at the lower central part of the machine is engaged by three bevel gears 44 utilized in imparting the relatively high speed to the tool heads and by one bevel gear 45 forming a part of the indexing mechanism. This gear 45, as will be seen by reference to Fig. 11 and Fig. 13, is secured to the inner end of a horizontally and radially disposed shaft 54 journaled in the base casting, and at its outer end this shaft is provided with a worm 54$^a$ which engages and rotates at a constant speed a worm wheel 55 on a sleeve 55$^a$ (see Fig. 20) which is rotatably mounted on a vertical pinion shaft 55$^b$ which as shown in Fig. 11 is supported in bearings carried by the frame members 10 and 11. This shaft 55$^b$ has a pinion 55$^c$, in mesh with a Geneva motion gear 56 mounted on a vertical shaft 56$^a$ supported in bearings of an indexing unit fixture 57 supported by the base member of the frame. A clutch member 55$^d$ is keyed and slidably mounted on the sleeve 55$^a$ and is adapted to engage a clutch member 55$^e$ secured to the pinion shaft 55$^b$ so that when the clutch is thrown in, the Geneva motion gear 56 is rotated at a constant speed, but is stationary when the clutch is thrown out. The Geneva motion gear has a roller 56$^b$ on its upper face and when said gear is started up, the roller will enter one of four slots 58$^a$ on an indexing disk 58 and rotate said indexing disk a quarter of a revolution. This quarter turn of the indexing disk turns the work spindle carrier through a quarter of a revolution, this being accomplished by a gear 58$^b$ on the indexing disk mounted on vertical shaft 58$^c$, this gear (see Fig. 11 and Fig. 13) engaging a pinion 58$^d$ on a vertical shaft 58$^e$, this shaft 58$^e$ being provided at its upper end with a pinion 58$^f$ which engages an internal gear 58$^g$ secured to the under side of the spindle carrier 22. This internal gear is shown in several figures of the drawing including Figs. 5 and 11. The shaft 58$^e$ is supported at its upper end by the column or hub 11$^e$ of the frame and at its lower end by a plate or bracket 71$^b$ carried by the skirt 11$^d$ of the frame.

After each indexing movement the spindle carrier is definitely positioned with the work spindles in proper position with respect to the work and loading stations, and this is brought about by means of a vertically movable locking bolt 59, movable through the guide-way 11$^f$ and provided with a tapered upper end adapted to engage successively in four equally spaced tapered bushings 59$^a$ carried by the spindle carrier, one of these tapered bushings being shown in Fig. 5. This locking pin 59 has connected to its lower end a rod 59$^b$ which is pulled downward against the pressure of a spring 59$^c$ by the indexing mechanism as will be subsequently explained, so as to withdraw the locking bolt from the tapered bushing of the spindle carrier and permit the indexing movement to take place.

Furthermore, after each indexing movement is completed, the spindle carrier is powerfully clamped down onto the guideway, and this is accomplished by four substantially vertical clamping arms 60 pivotally supported by the spindle carrier directly beneath the four working spindles and provided at their lower ends with clamping jaws adapted to be forced outwardly into contact with adjustable wedge blocks 60$^a$ carried by the body of the guide-way 11$^f$ on the frame, and extending radially inward. When these clamping arms are released, springs 60$^b$ (see Fig. 19) or equivalent means carried by the spindle carrier swing the arms inward slightly so as to release them from the wedge blocks.

The clamping arms are simultaneously moved outwardly to tightly engage the wedge blocks by four levers 61, which are pivotally supported at 61$^a$ on a head or partition 11$^c$ of the frame member 11 as clearly shown in Fig. 5 and Fig. 19. When these levers are swung to substantially horizontal position, rollers 61$^b$ at the outer ends of these levers engage and powerfully clamp the arms 60 against the wedge blocks 60$^a$. These levers 61, which are adapted to be rocked in radial planes as best shown in Fig. 3, extend downwardly through slots in the frame head 11$^c$, and at their inner ends they are pivotally connected at 61$^c$ to links, each composed of two parts 61$^d$ and 61$^e$, as will be observed particularly by reference to the upper left hand corner of Fig. 7, where the details of one of these two part links are shown. The two parts 61$^d$ and 61$^e$ are telescopically arranged, the former extending into the latter which has a body portion in the form of a sleeve or barrel. When pressed upward the two parts may yield slightly, and in so doing a spring 61$^f$ within the member 61$^e$ is compressed, but the parts cannot be extended or pulled apart any further than illustrated in Fig. 7, in view of the fact that the member 61$^d$ has a shoulder in the form of a collar 61$^g$ which engages a corresponding shoulder on the end of the member 61$^e$.

The lower ends of the link members 61$^e$ are pivotally connected at 61$^h$ to the upper end of a controller slide 70 which is a cylindrical member centrally disposed with respect to the machine and slidably mounted on a downwardly extending boss of the bracket 30 referred to in the early part of the specification and in an upwardly extending boss or hub of the lower casting 28. The drive shaft 27 extends freely through the center of this controller slide 70. In recessed portions of the upper part of the controller slide and also part of the bracket 30 there is a coil spring 70$^a$ which is compressed when the controller slide is moved upwardly, and assists gravity in lowering the slide when it is released in the manner hereinafter explained. The controller slide 70 performs several functions, one of these functions which may be noted at this time being to actuate the clamping levers 61. In Fig. 5 the controller slide 70 is in its lowermost position, and therefore the levers 61 are in inclined position and the rollers at the outer ends of these levers are out of engagement with the clamping arms 60. When, however, the controller is elevated it moves the levers to substantially horizontal position, causing the clamping arms to engage the wedge blocks 60$^a$ so as to tightly clamp the spindle carrier on the guide-way of the frame.

A second function of this controller slide which may now be noted is to cause the engagement and disengagement of the clutch 29 which controls the spindle drives. In order that this function may be performed, the clutch shifting yoke or lever 29$^a$ which engages the clutch shifting member 29$^c$, has extensions or ears, here designated 29$^x$, provided with slots loosely engaging one of the pins connecting one of the clamping levers 61 to one of the link members 61$^d$ (see Figs. 3 and 5). The result is that when the controller slide is elevated, it throws in the clutch 29, and when it is lowered it disengages the clutch, and at the same time pulls the cone shaped lower part of the clutch shifting member 29$^c$ against the conical brake seat of the bracket 30. This almost instantly stops the spindle drives.

The lowering of the controller slide 70 is controlled by the three controller lock pins 51 which are spaced around the controller in the plane indicated by the controller lock pin shown in Fig. 5, and additionally by a so-called operator's lock pin 71, which in this instance is arranged above the indexing unit and somewhat above the plane of the three controller lock pins 51 of the feed units, but like the latter is arranged horizontally with its inner end adjacent the controller slide 70, and is adapted to be moved in an endwise direction toward and from the same. The operator's lock pin is slidably mounted in a boss 71$^a$ on a plate 71$^b$ secured to the depending skirt 11$^d$ on the frame head 11$^c$. As will be seen by reference to Fig. 11, a spring 71$^c$ yieldingly opposes the outward movement of the operator's lock pin 71, and will, when the pin is released, move it inwardly to locking position. The controller slide 70 has four lock pin blocks 72 under which the inner ends of the four lock pins are adapted to engage to hold the controller slide 70 in elevated position and thus prevent it from lowering.

It will be obvious, therefore, that the controller cannot drop to perform the functions already explained, and the additional function of engaging the clutch of the indexing unit so as to start the indexing mechanism in operation, unless all four lock pins are moved outwardly from beneath the lock pin blocks 72.

It has already been explained that the several controller lock pins 51 associated with, and forming parts of the feed units are automatically withdrawn as the cycles of operations at the different work stations are completed. The operator's lock pin 71 is provided chiefly for the purpose of preventing the start of the indexing movement before the operator has completed his duties of removing a finished or machined work piece from the chuck on the work spindle at the loading station, and placing a new work piece therein. To this end, I provide on the outer part of the machine adjacent the loading station a so-called operator's lever 73 (see Figs. 1 and 5). This lever is connected to the outer end of a shaft 73$^a$ supported by the frame and extending inwardly toward the center of the machine just beneath the frame head 11$^c$. At its inner end this shaft is provided with a cam disk 73$^b$. When the operator has put a new piece on the work spindle at the loading station, he moves his control lever 73 upwardly, thereby rotating the rod 73$^a$ and cam disk 73$^b$ through a part of a revolution. By this action the cam disk 73$^b$ by reason of cam lugs 73$^c$ provided on its inner face (see Figs. 11, 15 and 16) moves inwardly toward the center of the machine a lever 74 which is secured to and thereby turns a rock shaft 74$^a$ which is supported in vertical position by the plate 71$^b$ attached to the skirt 11$^d$ of the frame head as already explained, this shaft being shown in section in Fig. 4, and in elevation in Fig. 11 and Fig. 13. At its lower end this rock shaft has a lever 74$^b$ whose inner end engages the operator's lock pin 71 in the manner illustrated in Figs. 4 and 11. The described movement imparted to the rock shaft 73$^a$ gives an outward movement to the lever 74$^b$ at the bottom thereof, and this withdraws the operator's lock pin 71 from beneath the lock pin block 72 of the controller. Therefore, as soon as the controller lock pins 51 of the feed units are withdrawn successively or simultaneously as the case may be, the controller slide 70 is lowered, this taking place immediately after the last controller lock pin is withdrawn from beneath the associated block 72.

However, before the controller slide 70 reaches its lowest point, the cam disk 73$^b$ which was turned as above explained when the operator moved his lever 73 upward, is turned back to its original position, restoring the operator's lever to its former horizontal position. This is accomplished by providing on the lever 29$^a$ for shifting the clutch 29, an extension 29$^y$, and by providing on the periphery of the cam disk 73$^b$ a shoulder 73$^d$, which shoulder is engaged and shifted by the lever extension 29$^y$ (see Figs. 11, 15 and 16) restoring the shaft 73$^a$ and disk 73$^b$ to their former positions when the clutch lever 29$^a$ is pulled downward to cause the disengagement of the clutch 29 by the lowering of the controller slide 70.

Thus when the operator has finished his work at the loading station and has swung upward the operator's lever 73, the operator's lock bolt 71 is withdrawn, compressing the spring 71$^c$, but when the controller slide is being lowered, by the withdrawing of all the controller lock pins 51 by the several feed units, and when the clutch 29 is disengaged, the extension 29$^y$ of the clutch shifting lever 29$^a$ restores the parts 73, 73$^a$ and 73$^b$ to their former positions. This moves the cam 73$^c$ on the inner face of cam disk 73$^b$ with reference to the lever 74, and this in effect releases the operator's lock pin 71 so that it may be moved inward by the spring 71$^c$ against the associated lock pin block 72 so that when the controller slide is again elevated it may move by the action of the spring 71$^c$ beneath the block and may cooperate with the other controller lock pins 51 to hold the controller slide in elevated position.

In addition to the several above described functions performed by the controller slide when it is being lowered, it performs the important function of causing the starting of the indexing unit. To bring this about I mount on the bracket of the center casting (see particularly Figs. 5, 11 and 13) a lever unit 75 having an arm 75$^a$ extending beneath a block or shoulder 75$^c$ of the controller slide, so that when the controller slide is lowered it will rock this lever unit to the position shown in Fig. 11. Likewise this lever unit has an arm 75$^d$ oppositely disposed with respect to the arm 75$^a$, and provided at its free end with a roller 75$^e$. Obviously when the arm 75$^d$ is depressed, the arm 75$^a$ and controller slide will be elevated. Additionally this lever unit 75 has a downwardly extending arm 75$^f$, and when the controller slide is lowered, this arm moves in an endwise direction a rod 76 slidably mounted in the indexing fixture 57, as clearly shown in Fig. 11. When the rod 76 is moved outwardly in the manner just stated, it rocks an arm 77 attached to the clutch shifting lever or yoke 77$^a$ which is supported on the indexing unit fixture 57 and throws the clutch member 55$^d$ rotated at a constant speed into positive clutching engagement with the clutch member 55$^e$, and this starts the rotation of the Geneva motion gear 56 of the indexing unit.

The first function performed by the rotation of the Geneva motion gear 56 is to withdraw the lock bolt 59 out of engagement from one of the tapered bushings 59$^a$ of the spindle carrier. This, of course, must take place before any motion is imparted to the indexing gear 58, and hence to the spindle carrier. The withdrawal of the lock bolt 59 from holding or locking engagement with the spindle carrier is accomplished by means of an arc-shaped cam 78 on the under side of and near the periphery of the Geneva motion gear 56, and so positioned thereon that immediately after the Geneva motion gear starts its rotation it engages a roller 59$^d$ which is supported beneath the periphery of the Geneva motion gear in the path of the cam 78 thereof, on a short arm or bracket 59$^e$ (see Fig. 17) secured to the lower end of the rod 59$^b$, which extends downward from the lower end of the lock bolt 59. This arc-shaped or circular cam 78 is less than 90° in circumferential length and releases the rod 59$^b$ and lock bolt 59 so that it may be moved upwardly by the spring 59$^c$ and cause locking engagement with the spindle carrier at the completion of the indexing movement thereof.

Additionally the Geneva motion gear 56 (see Fig. 14) is provided on its under side with two arc-shaped or circular cams 79 and 80 which are arranged concentrically with respect to the first-named cam 78. These cams are of greater length than the cam 78, each extending about the Geneva motion gear for somewhat more than two-thirds of the circumference.

Immediately after the lock bolt 59 is withdrawn the roller 56$^b$ at the upper face of the Geneva motion gear 56 enters one of the slots 58$^a$ of the indexing gear 58 and rotates said gear through one-quarter of a revolution. This rotation of the indexing gear by means of the gear drive connecting said gear to the spindle carrier imparts a quarter turn to the spindle carrier.

When the spindle carrier has been rotated through a part of its motion the inner cam 80 on the bottom of the Geneva motion gear comes alongside the upper end of an upwardly projecting arm 77$^b$ attached to a clutch shifting lever 77$^a$ of the indexing-control clutch 55$^d$ (see Fig. 11), the purpose of this being to prevent downward movement of the clutch member 55$^d$ and its disengagement from the clutch member 55$^c$ when the controller slide 70 is elevated, and until after the Geneva motion gear has made one complete revolution.

When the spindle carrier has almost completed its indexing movement, the circular or arc-shaped cam 79 comes into action by engaging the roller 75$^e$ on the free end of arm 75$^d$ of the lever unit 75 and depresses the roller and arm 75$^d$ so as to elevate the arm 75$^a$ which, as before stated, engages the controller slide, and this elevates the slide, (see Figs. 11 and 13).

While the Geneva motion gear was rotating through a little more than one-quarter of a revolution all the indexing functions were performed. However, the motion of this gear is not stopped at this time, but on the other hand it completes its revolution, and just before the completion of its revolution the cam 80 rides out of engagement with the upper end of arm 77$^b$, and at this time a dog 81 provided on the lower face of the Geneva motion gear 56 as shown in Figs. 12 and 14 engages the upstanding arm 77$^b$ associated with the clutch lever 77$^a$ of the indexing control clutch and moves this arm inwardly, disengaging the clutch. As the Geneva motion gear may come to rest with the dog 81 opposite or in the path of the arm 77$^b$ when it is next actuated, a spring point 82 (see Fig. 21) is provided in the fixture 57 under the circular cam 79, and said spring point will rotate the Geneva motion gear a little further as soon as the clutch of the indexing unit is disengaged, this movement being just sufficient to move the dog 81 beyond or out of the path of arm 77$^b$. A further function of this spring point is to then hold the Geneva motion gear from rotating until the next indexing cycle, by the engagement of this spring point in a V-shaped groove 79$^a$ of the cam 79.

At the completion of the indexing movement the lock bolt 59 snaps back into locking engagement with respect to the spindle carrier, the cam 78 having released the roller 59$^d$ at the lower end of the lock bolt rod 59$^b$. As the controller slide 70 is raised the cone shaped lower end of the clutch shifting member 29$^c$ is released from the conical brake seat of the bracket 30, and as soon as the slidable controller starts to rise, the four links which are each composed of the two parts 61$^d$ and 61$^e$ raise the inner ends of the clamping levers 61, and when these levers reach substantially the horizontal position they act on the clamping arms to clamp the spindle carrier to the guideway of the frame, this taking place at the completion of the indexing movement, and being preceded by the snapping into place of the lock bolt 59.

When the controller slide 70 reaches almost its highest position it has so moved the clutch lever 29$^a$ as to cause the engagement of clutch 29, and this starts up the spindle drives.

At the same time the three blocks 72 of the controller slide, which co-operate with the three controller lock pins 51 of the feed units to hold the controller slide 70 in elevated position, engage and move three levers 83, which levers are supported by the three feed unit fixtures 37 as best shown in Fig. 7. The inner ends of these levers are so positioned that when the feed drums 36 come to rest as already described, the dog slides 50 are directly beneath said ends as shown in Fig. 7. In consequence when the inner ends of these levers are elevated near the end of the upward movement of the controller slide 70, their outer ends lower the three dog slides 50, which meanwhile have been holding the feed drums against movement, and move the dogs on said dog slides out of engagement with the three controller lock pins 51. When this takes place, these controller lock pins are released and move toward the controller slide 70 under the action of the springs 52° which move the bell cranks connected to these lock pins, and the lock pins come to rest with their inner ends engaging the controller slide under the three blocks 72 associated with these lock pins. At or about the same time the operator's lock pin 71 is moved inward by the spring associated therewith beneath the block 72 with which this lock pin co-operates.

The slidable controller now having reached its highest point will drop about three-fourths of an inch and the blocks 72 come to rest on top of the inner ends of the controller lock pins 51 and the operator's lock pin 71 which hold the controller slide against any further downward movement until the lock pins are again withdrawn during the succeeding cycle. It will be noticed that the slight lowering of the controller slide when the blocks re-engage the lock pins has no effect on the clamping levers 61 and clutch shifting lever 29$^a$, as the springs 61$^f$ in the two part links 61$^d$ and 61$^e$ were during the final upward movement of the controller slide slightly compressed, and these links were shortened to an extent equal to the subsequent slight downward movement of the controller slide of about three-fourths of an inch as above stated.

When the controller lock pins 51 of the three feed units are released from the dogs carried by the dog slides 50, the slides 53 controlling the clutches of the feed units are released from the bell crank arms 52$^b$ and are moved upwardly under the action of the springs associated therewith so as to release the clutch shifting levers 45$^a$ which under the action of the spring points 45$^e$ throw the intermediate clutch elements of the three clutches of the feed units into engagement with the high speed driving members, starting all three feed units in operation. It is to be noted that when the intermediate clutch elements of the three feed unit clutches were previously brought to neutral position they were disengaged from the relatively fast driving members 41$^d$, but as the spring point blocks 46 and the spring point 45$^e$ have not changed their relative positions, when the clutch shifting levers 45$^a$ are released in the manner just explained, they will throw the movable or intermediate clutch elements 41$^b$ into engagement with the relatively fast driving members 41$^d$, and the drums will start to rotate with a relatively quick motion, thus causing the two tool heads at each working station to again approach the work piece with a relatively rapid motion. This forms the start for the next cycle of operations.

In the above explanation it was stated that right after the operator has completed loading the chuck at the loading station, he swings his operating lever 73 upward to permit the completion of the next cycle of the machine. However, if desired, the operator may swing the operating lever in the opposite direction or downward, in which event the machine will be set for continuous motion or with a continuous succession of complete cycles wherein the operator's lock pin 71 has no control whatsoever on the timing of the indexing operation. By throwing his lever downwardly the cam disk 73$^b$ at the inner end of the shaft 73$^a$ is partly rotated in the opposite direction so that the operator's lock pin is held continuously in retracted position and the shoulder 73$^d$ is moved altogether out of the path of the extension 29$^y$ of the clutch shifting lever 29$^a$. This continuous functioning of the machine with regularly repeated cycles may be convenient in case the loading at the loading station can be done safely within the time that the tool heads are being actuated.

It may be desirable to stop the tool slide and the facing head at a work station during a period of a cycle in order to inspect or adjust the tools, and after resetting, to take trial cuts. I have provided means which will enable the operator to do this, and to move the tool slide and facing head by hand power without interfering with the other work stations or the automatic functions of the machine, except to delay the start of the indexing function as will be explained.

The movement of the tool slide and facing head at any work station may be stopped instantly by throwing a lever 84 from left to right as the same is viewed in Fig. 6 and Fig. 7, first pulling out a spring actuated handle 84$^a$ so as to withdraw a holding pin which projects inwardly from the handle into a hole 84$^b$ of the corresponding slide support 14, and then allowing it to snap into a similar hole after the lever has been thrown. One of these levers 84 and the parts associated therewith, and in fact, all the parts now to be described, are duplicated at the different work stations, each lever being located on the left hand side of the tool slide support 14 at each work station within easy reach of the operator.

Each lever 84 is mounted on the outer end of a shaft $84^c$ extending transversely of the slide support and secured to this shaft is a downwardly extending arm $84^d$, the lower end of which is connected to a rod 85 which is slidingly supported in part by the frame of the machine and by the feed unit fixture 37. When the lever 84 is given the movement described, the rod 85 is moved inward in an endwise direction, and this movement shifts a bell crank 86 supported by the feed unit fixture 37 as shown in Figs. 6 and 7, said bell crank having an arm $86^a$ connected to the slide 53, which slide as previously explained, is lowered to disengage the clutch $41^b$ of the feed unit. In the automatic functioning of the machine this slide is moved downward so as to throw the clutch of the feed unit to neutral position by a downward movement of the bell crank arm $52^b$, but this manually operated disengaement of the clutch through the bell crank 86, rod 85 and hand lever 84, does not in any way affect, nor is it affected by the parts which are normally instrumental in the automatic disengagement of the clutch. Thus it will be seen that when the hand lever 84, referred to, is thrown to the right, the clutch controlling the feed unit is immediately disengaged, and this instantly stops the movement of the drum and therefore the movement of the tool heads of the work station.

It should be noted that when the clutch $41^b$ of the feed unit at any work station is thus manually disengaged and the movement of the tool heads stopped, the controller lock pin 51 of the feed unit is not moved by said action and remains as before, with its inner end beneath the block 72 of the controller slide 70, so that this controller lock pin will prevent the lowering of the controller slide as long as the clutch remains disengaged through the action of the manually controlled parts above described.

The shaft $84^c$ to which the hand lever 84 is attached, likewise has an upstanding arm $84^e$, and this arm constitutes a clutch shifting arm for a clutch member 85 splined to and slidable on an extension $36^b$ of the shaft of drum 36, this extension projecting out through the side of the frame and between the sides of the slide support 14. When the hand lever 84 is given its left to right movement above stated, this clutch member is caused to engage a clutch member 87, forming a part of a worm wheel 88 which is normally loose on the extension $36^b$ of the drum shaft. This worm wheel 88 engages a worm 89, shown by dotted lines in Fig. 7, this worm being on a shaft $89^a$ extending transversely through the sides of the slide support 14, and provided at its outer end with a hand wheel 90, which is also on the left hand side of the slide support near the hand lever 84 (note Fig. 1). When the clutch members 85 and 87 are engaged at any work station, the tool slide and facing head at that station may now be moved by hand power, and trial cuts may be taken while the other work stations uninterruptedly complete their functions. However, the controller slide will not drop, and the indexing of the spindle carrier will not take place until the hand lever 84 is again moved to the left to disengage the clutch elements 85 and 87 of the hand power drive and release the slide 53, which in turn will release the clutch operating lever $45^a$ of the feed unit clutch $41^b$ and permit the drum 36 to again be driven by power as before to complete its normal revolution and not until the tools carried by the tool heads have completed their cutting and the tool heads have returned will the dog of the dog slide 50 of the drum of the station in question withdraw the controller lock pin 51 of the station and permit the controller slide to drop and the indexing movement to take place.

It was heretofore stated that among the numerous advantages of my improved machine is the fact that a tool slide and its tool may be steadied by one or more pilot bars. In the main figures of the drawings I have not shown these pilot bars, but have shown them for one work station in Figs. 22 and 23. By referring to these figures it will be observed that the tool slide is provided with a pilot bar holder, in this case in the form of an inverted U-shaped bracket 91, the lower portions of which are fastened by screws 92 to opposite sides of the slide. This bracket may be provided with one or with more than one pilot bar, and in this instance it is provided with two pilot bars 93 each secured in a boss 94 of the bracket and extending horizontally inward therefrom.

When it is desired that the tool slides be steadied by the pilot bars, such as shown in Figs. 22 and 23, and which can be arranged at all the different work stations, the cover 12 will be provided above, and in this instance on opposite sides of the work spindles, with bushings 95 into which the pilot bars 93 are adapted to slide with a close fit so that the steadying function will be performed. Obviously these bushings 95 may be cast integral with the cover 12, but if desired, they may be formed on a separate bracket adapted to be attached to the cover 12 or other appropriate part. In fact, it is not essential that these bushings be formed integral with the cover 12, or formed on parts designed to be attached thereto, for they may be carried by, or formed as a part of the spindle carrier, in which event, at the end of each indexing movement one of these bushings 95 will be in exact alignment with one of the pilot bars 93.

It will be observed that with the present design, i. e. with the spindle arranged horizontally, and with the tool slides working in a horizontal plane, the bushings 95 are not apt to become clogged with chips, as might be the case if the work spindles and slides were arranged vertically.

Aside from the slide steadying function of these pilot bars they may be utilized as supports for additional tools should it be desired to equip the work stations with more than the two tool heads hereinbefore described.

Above I have described not only the construction but the operations and functions of all parts of the machine. I will now, however, give a brief description. Assuming that the indexing has just been completed, the three work spindles at the work stations are rotated at a constant speed which can, as before stated, be varied by changing the ratio of the external gears $32^c$ and $32^d$ on the outside of the top or cover 12. The tool heads are now being moved with a relatively rapid motion toward the work, and at predetermined times the adjustable dogs 48 on the feed drums throw the clutches of the feed units from the relatively high to the relatively slow speed driving members, and when this occurs, the relatively slow or cutting feeds of the tool heads begin, and when this is completed the relatively fixed dogs 49 again change the speed of the tool heads to the relatively rapid motion, whereupon the tool heads are rapidly moved back to their former positions, and at or about the time they reach their normal position the dogs carried by the dog slides 50 withdraw the controller lock pins 51 from beneath the controller blocks 72, and at the same time throw the clutches of the feed units so as to instantly stop the rotation of the drums 36. Assuming that the operator's lock pin had been previously withdrawn, the controller slide 70 now drops.

While this was taking place the operator removes the finished work piece from the chuck at the loading station and replaces it with a new work piece, and then in the ordinary operation he throws his hand lever 73 upward, withdrawing the operator's lock pin 71 from holding position with respect to the controller slide.

When the controller slide drops after the last feed unit has completed its function and withdrawn its controller lock pin, the clutch 29 is disengaged instantly stopping the spindle drives, though the power operated shaft 27 continues its rotation at the constant speed. Likewise during this movement of the controller slide, the spindle carrier is unclamped from the guide-way and the operator's lever 73 is restored to normal position and the operator's lock pin 71 is released so that it may subsequently, i. e. on the elevating of the controller slide move under the corresponding holding block 72. When the controller slide almost reaches its lowermost position it causes the indexing clutch to be engaged, starting up the rotation of the Geneva motion gear. This withdraws the lock bolt 59 from holding engagement wth the spindle carrier, and immediately after the spindle carrier is indexed or moved through an arc of 90°.

Near the end of the indexing movement the controller slide is elevated, and when this takes place the lock bolt is released so that it may snap back into holding engagement with the spindle carrier at the completion of the indexing movement; the clutch 29 controlling the spindle drives is again thrown in so as to start the rotation of the work spindles; the spindle carrier is now again powerfully clamped to the guide-way, and in the final movements of the controller slide the controller lock pins 51 are released so as to move under the holding blocks 72 of the controller slide and at the same time the drums which operate the tool heads are released and the intermediate clutch members of the feed unit clutches are again thrown into engagement with the fast driving members, causing a rapid movement of the tool heads toward the work, this being the begining of the next cycle. After the Geneva motion gear has completed its revolution, the clutch of the indexing unit is thrown out and the Geneva motion gear comes to rest in position to again function in the manner above explained at the beginning of the next indexing operation.

Should the operator desire to adjust his tools or to take trial cuts, this can be done at any working station during the cycle of operation through the medium of the hand lever 84 and hand wheel 90. He can spend as much time in this work as he desires without any liability of the machine indexing, for as already explained, it is not until after the parts are restored to their normal position for automatic functioning, and until after the normal power operated movements of the tool head are completed that the indexing can take place.

Thus it will be seen that the objects and advantages stated at the beginning of the specification are attained.

While I have shown only one construction or one embodiment of my invention, I do not desire to be confined to the exact details and exact arrangements and constructions of parts shown and described, but aim in my claims to cover all modifications which do not involve a departure from the spirit and scope of my invention in its broadest aspects.

Having described my invention, I claim:

1. In an automatic multiple spindle chucking machine, a spindle carrier having a plurality of horizontally arranged rotary work spindles, a frame supporting the spindle carrier and having work stations provided with tool heads located outside of the spindles, mechanisms for operating the tool heads at relatively fast speed for use when the tools are approaching or receding from the work, and at relatively slow speed for feeding the tools along the work, automatically controlled means whereby a tool head at each work station is operated first by one and then the other of said mechanisms, and means for rotating the work spindles.

2. In an automatic multiple spindle chucking machine, a spindle carrier having a plurality of horizontally and radially arranged rotary work spindles, a plurality of spindle drives, a plurality of tool heads arranged outside of said work spindles, separate mechanisms for operating the tool heads at relatively fast and relatively slow speeds, one for use while the tools are approaching or receding from the work, and the other for use when the tools are feeding along the work, automatically controlled means for changing from one speed to the other, and automatically controlled means for stopping the tool head movements.

3. In an automatic multiple spindle chucking machine, a spindle carrier having a plurality of horizontally and radially arranged work spindles, a plurality of tool heads arranged outside the work spindles, relatively fast and relatively slow speed operating mechanisms for each tool head, the former for use when the tools are approaching or receding from the work, and the latter for use when the tools are feeding along the work, spindle drive mechanisms, means whereby the relatively slow tool head operating mechanisms are driven from the work spindle drives, means for automatically causing the tool heads to be operated by one and then the other of said driving mechanisms, and means for automatically stopping the tool heads.

4. In an automatic multiple spindle chucking machine, a spindle carrier having a plurality of horizontally and radially arranged work spindles, a plurality of tool heads arranged outside the work spindles, relatively fast and relatively slow speed operating mechanisms for each tool head, the former for use when the tools are approaching or receding from the work, and the latter for use when the tools are feeding along the work, spindle drive mechanisms, means whereby the relatively slow speed tool head operating mechanisms are driven from the work spindle drives, means for automatically causing the tool heads to be operated first by one and then the other of said driving mechanisms, means for automatically stopping the tool heads, and separate means for stopping the work spindle drives.

5. In an automatic multiple spindle chucking machine, a spindle carrier having a plurality of horizontally and radially arranged rotary work spindles, a plurality of tool heads arranged outside of the work spindles, means for rotating the work spindles, means for actuating the tool heads, an indexing mechanism for the spindle carrier, and means for automatically controlling the spindle drives, the tool head actuating means and the indexing mechanism.

6. In an automatic multiple spindle chucking machine, a spindle carrier having a plurality of horizontally and radially arranged rotary work spindles, a stationary part supporting the spindle carrier and carrying a plurality of tool heads arranged outside the work spindles, spindle drive mechanisms, mechanisms for moving the tool heads at relatively fast and relatively slow speeds, automatically controlled means for stopping the movements of the tool heads, an indexing mechanism for the spindle carrier, and means for automatically causing the operation of the indexing mechanism when the tool heads have receded from the work and returned to their outer positions.

7. In an automatic multiple spindle chucking machine, a spindle carrier having a plurality of horizontally and radially arranged rotary work spindles, a stationary part supporting the spindle carrier and carrying a plurality of tool heads arranged outside the work spindles, spindle drive mechanisms, mechanisms for moving the tool heads, automatically controlled means for stopping the movements of the tool heads, means for automatically stopping the spindle drives, an indexing mechanism for the spindle carrier, and means for automatically causing the operation of the indexing mechanism when the tool heads have completed their normal cycles and have been stopped.

8. In an automatic multiple spindle chucking machine, a main driving shaft, a frame having work stations, a rotary spindle carrier carried by the frame and having a plurality of horizontally and radially disposed work spindles, a plurality of tool heads carried by the frame at different work stations to co-operate with said work spindles and arranged outside the work spindles, independent work spindle drives adapted to be operated from said drive shaft, independent operating means for the tool heads of the different work stations, and means associated with the tool head of each work station for automatically stopping the tool head operating means independently of the tool heads of the other work stations when the head has completed its cycle of movement and returned to its outer position.

9. In an automatic multiple spindle chucking machine, a main driving shaft, a frame, a rotary spindle carrier carried by the frame and having a plurality of horizontally and radially disposed work spindles, a plurality of tool slides carried by the frame to co-operate with said work spindles and arranged for horizontal radial movements, independent work spindle drives adapted to be operated from said drive shaft, independent operating means for the different tool slides, means associated with each slide for automatically stopping the slide operating means independently of the other slides when the slide has completed its cycle of movement and returned to its outer position, and means for automatically stopping the spindle drives after the tool slides have severally completed their cycles and returned to their outer positions.

10. In an automatic multiple spindle chucking machine, a main driving shaft, a frame, a rotary spindle carrier carried by the frame and having a plurality of horizontally and radially disposed work spindles, a plurality of tool slides carried by the frame to co-operate with said work spindles and arranged for horizontal radial movements, independent work spindle drives adapted to be operated from said drive shaft, independent operating means for the different tool slides, means associated with each slide for automatically stopping the slide operating means independently of the other slides when the slide has completed its cycle of movement and returned to its outer position, indexing mechanism for the spindle carrier, and means for automatically causing the operation of the indexing mechanism when all the tool slides have completed their cycles and have returned to their outer positions.

11. In an automatic multiple spindle chucking machine, a main driving shaft, a frame, a rotary spindle carrier carried by the frame and having a plurality of horizontally and radially disposed work spindles, a plurality of tool slides carried by the frame to co-operate with said work spindles and arranged for horizontally radial movements, independent spindle drives adapted to be operated from said drive shaft, independent operating means for the different tool slides, means associated with each slide for automatically stopping the slide operating means independently of the other slides when the slide has completed its cycle of movement and returned to its outer position, indexing mechanism for the spindle carrier, and means for automatically stopping the work spindle drives and for causing the operation of the indexing mechanism after all the tool slides have completed their cycles and have returned to their outer position.

12. In an automatic multiple spindle chucking machine, a spindle carrier having a plurality of horizontally arranged rotary work spindles, a plurality of horizontally movable tool slides, a facing tool head associated with each tool slide, mechanisms for operating the tool slides and their associated facing tool heads at relatively fast speed for use when the tools are approaching or receding from the work, and at relatively slow speed for feeding the tool along the work, automatically controlled means for causing each tool slide and its associated facing tool head to be operated first by one and then the other of said mechanisms, and means for rotating the work spindles.

13. In an automatic multiple spindle chucking machine, a frame having a plurality of work stations, a plurality of tool heads arranged at each work station and including a tool slide and a facing tool head, a rotary spindle carrier supported by the frame and provided with a plurality of horizontally and radially disposed rotary work spindles arranged inside the tool heads of the different work stations, a plurality of spindle drives, a plurality of separate mechanisms for operating the sets of tool heads at the different work stations at relatively fast and relatively slow speeds, one for use while the tools are approaching or receding from the work, and the other for use when the tools are feeding along the work, automatically controlled means for changing from one speed to the other, and automatically controlled means for stopping the tool head movements.

14. In an automatic multiple spindle chucking machine, a frame having a plurality of work stations, a plurality of tool heads arranged at each work station and including a tool slide and a facing tool head, a rotary spindle carrier supported by the frame and provided with a plurality of horizontally and radially disposed rotary work spindles arranged inside the tool heads of the different work stations, a plurality of spindle drives, a plurality of separate mechanisms for operating the sets of tool heads at the different work stations at relatively fast and relatively slow speeds, one for use while the tools are approaching or receding from the work, and the other for use when the tools are feeding along the work, automatically controlled means for changing from one speed to the other, automatically controlled means for stopping the tool head movements, and separate means for stopping the work spindle drives.

15. In an automatic multiple spindle chucking machine, a frame having a plurality of work stations each provided with a tool head in the form of a slide and a facing tool head, a rotary spindle carrier supported by the frame and having a plurality of horizontally and radially disposed work spindles arranged inside the tool heads of the different work stations, means for rotating the work spindles, means for actuating the tool heads, an indexing mechanism for the spindle carrier, and means for automatically controlling the work spindle drives, the tool head actuating means and the indexing mechanism.

16. In an automatic multiple spindle chucking machine, a frame having a plurality of work stations, tool heads arranged at the different work stations, a rotary spindle carrier carried by the frame, a plurality of work spindles carried by the spindle carrier and arranged horizontally and radially inside the tool heads at the different work stations, a drive shaft, an independent drive for each work spindle, independent mechanisms for operating the tool heads, automatically controlled means for independently stopping the tool heads at the different work stations, an indexing mechanism for the spindle carrier, and automatically controlled means for causing the work spindle drives to be stopped and the operation of the indexing mechanism to take place after the tool heads of all the different work stations have completed their cycles and have returned to their former or normal positions.

17. In an automatic multiple spindle chucking machine, a frame having a plurality of work stations, tool heads arranged at the different work stations, a rotary spindle carrier carried by the frame, a plurality of work spindles carried by the spindle carrier and arranged horizontally and radially inside the tool heads at the different work stations, a drive shaft, an independent drive for each work spindle, independent mechanisms for operating the tool heads, automatically controlled means for independently stopping the tool heads at the different work stations, an indexing mechanism for the spindle carrier, automatically controlled means for causing the work spindle drives to be stopped and the operation of the indexing mechanism to take place after the tool heads of all the different work stations have completed their cycles and have returned to their former or normal positions, and means for interrupting the movement of the tool head or heads at any work station, and for operating the same manually during the period of the cycle.

18. In an automatic multiple spindle chucking machine, a frame having a plurality of work stations, tool heads at the work stations, a rotary spindle carrier carried by the frame, a plurality of work spindles carried by the spindle carrier and arranged horizontally and radially inside the tool heads of the work stations, a drive shaft, an independent spindle drive for each work spindle, independent operating mechanisms for the tool heads of the different work stations, clutching means between the independent spindle drives and the drive shaft for starting and stopping the spindle drives, clutching means controlling the tool head operating mechanisms for starting and stopping them, an indexing mechanism for the spindle carrier, clutching means for starting and stopping the indexing mechanism, and automatically controlled devices for operating the clutching means for the tool heads, the clutching means for the spindle drives and the clutching means for the indexing mechanism.

19. In an automatic multiple spindle chucking machine, a frame having a plurality of work stations, tool heads at the work stations, a rotary spindle carrier supported by the frame and provided with horizontally and radially arranged work spindles arranged inside the tool heads of the different work stations, a drive shaft, an independent drive for each work spindle, a clutch controlling said drives, independent tool head operating means for each work station, clutching means controlling the same, an indexing mechanism, clutching means controlling said indexing mechanism, and automatic controlling devices whereby the machine passes through one cycle after another during which cycle the tool heads at the different work stations pass through individual cycles of movement and are then stopped, the work spindles are rotated and then stopped after the cycles are completed at the different work stations, and the indexing mechanism is operated after the work spindle drives are stopped, after which the next cycle of the machine is automatically started.

20. In an automatic multiple spindle chucking machine, a frame having a plurality of work stations, tool heads at the work stations, a rotary spindle carrier carried by the frame and provided with a plurality of equally spaced radially and horizontally arranged work spindles located inside the tool heads of the work stations, a drive shaft, an independent spindle drive for each work spindle, a tool head operating member arranged at each work station, said members having provision for moving the tool heads to and from the work, mechanisms for driving said tool head operating members, means for automatically stopping said tool head operating members as the cycles of movements of the tool heads are completed at the different work stations, and independent means for automatically controlling the work spindle drives.

21. In an automatic multiple spindle chucking machine, a frame having a plurality of work stations, tool heads at the work stations, a rotary spindle carrier carried by the frame and provided with a plurality of equally spaced radially and horizontally arranged work spindles located inside the tool heads of the work stations, a drive shaft, an independent spindle drive for each work spindle, a tool head operating member arranged at each work station, said members having provision for moving the tool heads to and from the work, mechanisms for driving said tool head operating members, means for automatically stopping said tool head operating members as the cycles of movements of the tool heads are completed at the different work stations, independent means for automatically controlling the work spindle drives, an indexing mechanism for the spindle carrier, and automatic controlling means therefor for causing the indexing to take place when the last tool head operating member has completed its function, and when the work spindle drives have been stopped.

22. In an automatic multiple spindle chucking machine, a frame having a plurality of work stations, tool heads at the work stations, a rotary spindle carrier supported by the frame, a plurality of equally spaced work spindles carried by the spindle carrier and arranged radially and horizontally inside the tool heads, an operating shaft, spindle driving mechanisms, tool head operating mechanisms, an indexing mechanism for the spindle carrier, and means comprising a controller for automatically controlling or timing the operation of the indexing mechanism.

23. In an automatic multiple spindle chucking machine, a frame having a plurality of work stations, tool heads at the work stations, a rotary spindle carrier supported by the frame, a plurality of equally spaced work spindles carried by the spindle carrier and arranged radially and horizontally inside the tool heads, an operating shaft, spindle driving mechanisms, tool head operating mechanisms, an indexing mechanism for the spindle carrier, and means comprising a controller movable in opposite directions for automatically controlling or timing the operation of the indexing mechanism.

24. In an automatic multiple spindle chucking machine, a frame having a plurality of work stations, tool heads at the work stations, a rotary spindle carrier supported by the frame, a plurality of equally spaced work spindles carried by the spindle carrier and arranged radially and horizontally inside the tool heads, an operating shaft, spindle driving mechanisms, tool head operating mechanisms, an indexing mechanism for the spindle carrier, and means comprising a centrally arranged controller for automatically controlling or timing the operation of the indexing mechanism.

25. In an automatic multiple spindle chucking machine, a frame having a plurality of work stations, tool heads at the work stations, a rotary spindle carrier supported by the frame, a plurality of equally spaced work spindles carried by the spindle carrier and arranged radially and horizontally inside the tool heads, an operating shaft, spindle driving mechanisms, tool head operating mechanisms, an indexing mechanism for the spindle carrier, and means comprising a centrally arranged controller movable in opposite directions for automatically controlling or timing the operation of the indexing mechanism.

26. In an automatic multiple spindle chucking machine, a frame having a plurality of work stations and a loading station, tool heads at the different work stations, a rotary spindle carrier supported by the frame, a plurality of equally spaced work spindles carried by the spindle carrier, said work spindles being arranged radially and horizontally inside the tool heads of the work stations, a vertically disposed drive shaft arranged centrally of the spindle carrier, spindle drives between said shaft and the work spindles, tool head operating mechanisms between said shaft and tool heads, an indexing mechanism, and means for automatically controlling and timing the operation of the indexing mechanism comprising a controller surrounding said drive shaft.

27. In an automatic multiple spindle chucking machine, a frame having a plurality of work stations and a loading station, tool heads arranged at the work stations, a rotary spindle carrier supported by the frame for movement about a vertical axis, a plurality of equally spaced work spindles supported by the spindle carrier and arranged horizontally and radially inside the tool heads, a drive shaft, spindle drives between said shaft and the work spindles, tool head operating mechanisms between the tool heads and said shaft, an indexing mechanism, operating mechanism between the indexing mechanism and said shaft, a controller for timing and controlling the operation of the indexing mechanism, and means whereby the indexing mechanism causes said controller to be shifted to its normal position.

28. In an automatic multiple spindle chucking machine, a frame having a plurality of work stations, tool heads arranged at the work stations, a rotary spindle carrier supported by the frame for movement about a vertical axis, a plurality of equally spaced work spindles supported by the spindle carrier and arranged horizontally and radially inside the tool heads, a drive shaft, spindle drives between said shaft and the work spindles, tool head operating mechanisms between the tool heads and said shaft, an indexing mechanism, operating mechanism between the indexing mechanism and said shaft, a controller for timing and controlling the operation of the indexing mechanism, a clutch for controlling the work spindle drives, and an operative connection between the clutch and the controller whereby said clutch is actuated by the movement of said controller.

29. In an automatic multiple spindle chucking machine, a frame having a plurality of work stations, tool heads arranged at the work stations, a rotary spindle carrier supported by the frame for movement about a vertical axis, a plurality of equally spaced work spindles supported by the spindle carrier and arranged horizontally and radially inside the tool heads, a drive shaft, spindle drives between said shaft and the work spindles, tool head operating mechanisms between the tool heads and said shaft, an indexing mechanism, operating mechanism between the indexing mechanism and said shaft, a controller for timing and controlling the operation of the indexing mechanism, means whereby the indexing mechanism causes the controller to be restored to normal position, a clutch controlling said work spindle drives, and an operative connection between the clutch and said controller whereby the work spindle drives are stopped when the controller moves in one direction and are started when the controller moves in the reverse direction.

30. In an automatic multiple spindle chucking machine, a frame having a plurality of work stations, tool heads arranged at the work stations, a rotary spindle carrier supported by the frame for movement about a vertical axis, a plurality of equally spaced work spindles supported by the spindle carrier and arranged horizontally and radially inside the tool heads, a drive shaft, spindle drives between said shaft and the work spindles, tool head operating mechanisms between the tool heads and said shaft, an indexing mechanism, operating mechanism between the indexing mechanism and said shaft, a controller for timing and controlling the operation of the indexing mechanism, clamping mechanism for clamping the spindle carrier to the frame, and an operative connection between said clamping mechanism and the controller whereby the spindle carrier is unclamped when the controller moves in one direction and is clamped to the frame when the controller is returned to its normal position.

31. In an automatic multiple spindle chucking machine, a frame having a plurality of work stations, tool heads arranged at the work stations, a rotary spindle carrier supported by the frame for movement about a vertical axis, a plurality of equally spaced work spindles supported by the spindle carrier and arranged horizontally and radially inside the tool heads, a drive shaft, spindle drives between said shaft and the work spindles, tool head operating mechanisms between the tool heads and said shaft, an indexing mechanism, operating mechanism between the indexing mechanism and said shaft, a controller for timing and controlling the operation of the indexing mechanism, a clutch controlling the spindle drives, clamping mechanism for clamping the spindle carrier and the frame, said clutch and clamping mechanism being operatively connected to said controller.

32. In an automatic multiple spindle chucking machine, a frame having a plurality of work stations, tool heads at the work stations, a tool head operating member at each work station, a rotary spindle carrier supported by the frame for movement about a vertical axis, a plurality of radially and horizontally arranged work spindles supported by the spindle carrier inside the tool heads, a drive shaft, spindle drives between the work spindles and said shaft, driving mechanisms between said shaft and the tool head operating members, an indexing mechanism, means for stopping and holding the tool head operating members against movement when the cycles of movement of the tool heads of the different work stations are completed, and means for automatically stopping the work spindle drives, for starting the operation of the indexing mechanism so that the spindle carrier will be indexed, and for subsequently releasing the tool head operating members.

33. In an automatic multiple spindle chucking machine, a frame having a plurality of work stations, tool heads at the work stations, a tool head operating member at each work station, a rotary spindle carrier supported by the frame for movement about a vertical axis, a plurality of radially and horizontally arranged work spindles supported by the spindle carrier inside the tool heads, a drive shaft, spindle drives between the work spindles and said shaft, driving mechanisms between said shaft and the tool head operating members, an indexing mechanism, means for stopping and holding the tool head operating members against movement when the cycles of movement of the tool heads of the different work stations are completed, and means comprising a movable controller member for automatically controlling the indexing mechanism.

34. In an automatic multiple spindle chucking machine, a frame having a plurality of work stations, tool heads at the work stations, a tool head operating member at each work station, a rotary spindle carrier supported by the frame for movement about a vertical axis, a plurality of radially and horizontally arranged work spindles supported by the spindle carrier inside the tool heads, a drive shaft, spindle drives between the work spindles and said shaft, driving mechanisms between said shaft and the tool head operating members, an indexing mechanism, means for stopping and holding the tool head operating members against movement when the cycles of movement of the tool heads of the different work stations are completed, means comprising a movable controller member for automatically controlling the indexing mechanism, and devices for controlling the movement of said controller member.

35. In an automatic multiple spindle chucking machine, a frame having a plurality of work stations, tool heads at the work stations, a tool head operating member at each work station, a rotary spindle carrier supported by the frame for movement about a vertical axis, a plurality of radially and horizontally arranged work spindles supported by the spindle carrier inside the tool heads, a drive shaft, spindle drives between the work spindles and said shaft, driving mechanism between said shaft and the tool head operating members, an indexing mechanism, means for stopping and holding the tool head operating members against movement when the cycles of movement of the tool heads of the different work stations are completed, means comprising a movable controller member for automatically controlling the indexing mechanism, and devices, part operated by said tool head operating members for controlling the movement of the controller member.

36. In an automatic multiple spindle chucking machine, a frame having a plurality of work stations, tool heads at the work stations, a tool head operating member at each work station, a rotary spindle carrier supported by the frame for movement about a vertical axis, a plurality of radially and horizontally arranged work spindles supported by the spindle carrier inside the tool heads, a drive shaft, spindle drives between the work spindles and said shaft, driving mechanisms between said shaft and the tool head operating members, an indexing mechanism, means for stopping and holding the tool head operating members against movement when the cycles of movement of the tool heads of the different work stations are completed, means comprising a movable controller member for automatically controlling the indexing mechanism, and a plurality of lock pins for controlling the movement of said controller member.

37. In an automatic multiple spindle chucking machine, a frame having a plurality of work stations, tool heads at the work stations, a tool head operating member at each work station, a rotary spindle carrier supported by the frame for movement about a vertical axis, a plurality of radially and horizontally arranged work spindles supported by the spindle carrier inside the tool heads, a drive shaft, spindle drives between the work spindles and said shaft, driving mechanism between said shaft and the tool head operating members, an indexing mechanism, means for stopping and holding the tool head operating members against movement when the cycles of movement of the tool heads of the different work stations are completed, means comprising a movable controller member for automatically controlling the indexing mechanism, and a plurality of lock pins for controlling the movement of the controller member, one of said lock pins being associated with each tool head operating member.

38. In an automatic multiple spindle chucking machine, a frame having a plurality of work stations, tool heads at the work stations, a tool head operating member at each work station, a rotary spindle carrier supported by the frame for movement about a vertical axis, a plurality of radially and horizontally arranged work spindles supported by the spindle carrier inside the tool heads, a drive shaft, spindle drives between the work spindles and said shaft, driving mechanisms between said shaft and the tool head operating members, an indexing mechanism, means for stopping and holding the tool head operating members against movement when the cycles of movement of the tool heads of the different work stations are completed, means comprising a movable controller member for automatically controlling the indexing mechanism, a plurality of lock pins controlling said controller member, one lock pin being associated with each tool head operating member, and means whereby each tool head operating member causes its associated lock pin to be moved to releasing position with respect to the controller member substantially at the time the tool head operating member comes to a stop.

39. In an automatic multiple spindle chucking machine, a frame having a plurality of work stations, tool heads at the work stations, a spindle carrier having a plurality of rotary work spindles adapted to co-operate with the tool heads of the different work stations, a drive shaft, driving means between the drive shaft and the work spindles, driving mechanism between said shaft and the tool heads, each including a tool head operating member and a clutch, a stop member carried by the tool head operating member for causing the clutch to be thrown to neutral position and to hold the clutch in neutral position, an indexing mechanism, a movable controller member for controlling and timing the indexing mechanism, a plurality of stop pins, one associated with each tool head operating member for controlling said controller member, means for restoring said controller member to normal position, and means whereby on the restoration of the controller member to normal position said stop member on each tool head operating member is shifted so as to cause the associated clutch to be released and the tool head operating member to operate to start a normal cycle of movement.

40. In an automatic multiple spindle chucking machine, a frame having a plurality of work stations, tool heads at the work stations, a spindle carrier rotatably supported by the frame and provided with a plurality of work spindles, a drive shaft, an independent spindle drive for each work spindle, each spindle drive comprising a worm wheel on the work spindle, a shaft having a worm engaging the worm wheel, the shaft being carried by the spindle carrier, and driving trains operatively connected to said drive shaft and adapted to rotate the worm shafts.

41. In an automatic multiple spindle chucking machine, a frame having a plurality of work stations and a loading station, tool heads at the work stations, a spindle carrier carried by the frame and having a plurality of radially and horizontally arranged work spindles arranged inside said tool heads, and a main drive shaft extending through the machine centrally of said spindle carrier and having a driving part above the spindle carrier.

42. In an automatic multiple spindle chucking machine, a frame having a plurality of work stations and a loading station, tool heads at the work stations, a rotary spindle carrier supported by the frame and adapted to be given a step by step movement, a plurality of equally spaced work spindles supported by said carrier and arranged radially and horizontally thereon inside the tool heads, a centrally disposed drive shaft, and separate spindle drives between said drive shaft and the different spindles and comprising gears carried by the frame, and gears carried by the spindle carrier and adapted to roll into and out of mesh with the first named gears.

43. In a multiple spindle chucking machine, a frame having a plurality of work stations, and inside the work station having a circular guide-way, a spindle carrier mounted on said guide-way, a plurality of rotary work spindles carried by the spindle carrier and arranged horizontally and radially thereon, and a spindle carrier cover supported by the frame and extending around and over the spindle carrier.

44. In a multiple spindle chucking machine, a frame having a plurality of work stations, and inside the work station having a circular guide-way, a spindle carrier mounted on said guide-way, a plurality of rotary work spindles carried by the spindle carrier and arranged horizontally and radially thereon, a spindle carrier cover supported by the frame and extending around and over the spindle carrier, a centrally disposed drive shaft extending up through the cover, and a plurality of spindle drives between said shaft and the work spindles and each including change speed gears outside of the cover.

45. In an automatic multiple spindle chucking machine, a frame provided with work stations having tool heads and provided with a circular guide-way inside the work stations, a spindle carrier rotatably supported on said guide-way, said guide-way being engaged by the outer part of the spindle carrier, means for centering the spindle carrier comprising a stationary annular part which the central part of the spindle carrier engages, and means independent of said centering means for clamping the spindle carrier to said guide-way.

46. In an automatic multiple spindle chucking machine, a frame provided with work stations having tool heads, a spindle carrier rotatably mounted on the frame and provided with a plurality of radially and horizontally disposed work spindles, a drive shaft disposed centrally and vertically of the machine, spindle drives between said shaft and the different work spindles, tool head operating means between said shaft and the tool heads of the different work stations, an indexing mechanism for indexing the spindle carrier, automatically operated devices for starting and stopping the spindle drives, for starting and stopping the operation of the tool heads, and for controlling the indexing mechanism, the tool head operating means and the indexing mechanism being located below the work spindles.

47. In an automatic multiple spindle chucking machine, a frame having a plurality of work stations provided with tool heads, a rotary spindle carrier having a plurality of horizontally and radially arranged work spindles arranged inside the tool heads, said frame having an annular guide-way engaged by the outer part of the spindle carrier and the frame having for the middle portion of the spindle carrier centering means independent of said guide-way.

48. In an automatic multiple spindle chucking machine, a frame having a plurality of work stations provided with tool heads, a rotary spindle carrier provided with work spindles arranged horizontally and radially inside the tool heads of the work stations, a drive shaft, spindle drives between said shaft and the work spindles, tool head operating means between said shaft and the tool heads, means provided at the different work stations for operating the tool heads manually, a controlling means located at each work station for disconnecting the tool heads from the power operated means, and for connecting the same to the manual operating means.

49. In an automatic multiple spindle chucking machine, a frame having a plurality of work stations having tool heads, means at the different work stations for operating the different tool heads manually, a spindle carrier carried by the frame and provided with horizontally and radially arranged work spindles inside the tool heads of the different work stations, a drive shaft, spindle drives between the drive shaft and work spindles, tool head operating means between the drive shaft and the tool heads and including clutches individual to the tool heads of the different work stations, automatically operated means for disengaging said clutches to stop the tool head movements, and manually controlled means for disengaging said clutches.

50. In an automatic multiple spindle chucking machine, a frame having a plurality of work stations having tool heads, means at the different work stations for operating the different tool heads manually, a spindle carrier carried by the frame and provided with horizontally and radially arranged work spindles inside the tool heads of the different work stations, a drive shaft, spindle drives between the drive shaft and work spindles, tool head operating means between the drive shaft and the tool heads and including clutches individual to the tool heads of the different work stations, means including slides one associated with each of said clutches for disengaging the clutches to stop the tool head movements, and automatic and manually operable means for shifting the slide at each work station.

51. In an automatic multiple spindle chucking machine, a frame having a plurality of work stations having tool heads, a rotary spindle carrier supported by the frame and provided with a plurality of rotary work spindles, indexing mechanism for the spindle carrier, a drive shaft, spindle drives between the said shaft and the work spindles, tool head operating means between said shaft and the tool heads, operating means between said shaft and the indexing mechanism, means for clamping the spindle carrier to the frame, means comprising a controller for automatically controlling the spindle drives and the indexing mechanism, and telescopic members connecting the controller to said clamping means.

52. In an automatic multiple spindle chucking machine, a frame having a plurality of work stations with tool heads, a spindle carrier provided with a plurality of rotary work spindles, an indexing mechanism for the spindle carrier, a drive shaft, spindle drives between said shaft and the work spindles, tool head operating mechanisms between said shaft and the tool heads of the different work stations, a clutch for disconnecting the spindle drives from said shaft, a controller connected to said clutch for controlling the same and for controlling the indexing mechanism, automatic means for controlling the operation of said controller, manually controlled means having a part acting in conjunction with the automatic means to control the controller, means for restoring the controller to normal position so as to cause the engagement of said clutch, and means whereby when said clutch is disengaged said manually controlled means is restored to normal position.

53. In an automatic multiple spindle chucking machine, a frame having a plurality of work stations with tool heads, a spindle carrier having a plurality of work spindles, an indexing mechanism for the spindle carrier, a drive shaft, spindle drives between said shaft and the work spindles, tool head operating means between said shaft and the tool heads, operating means between said shaft and the indexing mechanism, automatic means including a movable controller member which on moving in one direction stops the spindle drives and causes the operation of the indexing mechanism, and means comprising a member controllable by the operator and movable to one position to permit the start of one complete cycle of the machine, and movable in another position to permit repeated cycles to take place one after the other.

54. In an automatic multiple spindle chucking machine, a frame having a plurality of work stations with tool heads, a spindle carrier having a plurality of work spindles, an indexing mechanism for the spindle carrier, a drive shaft, spindle drives between said shaft and the work spindles, tool head operating means between said shaft and the tool heads, operating means between said shaft and the indexing mechanism, automatic means including a movable controller member which on moving in one direction stops the spindle drives and causes the operation of the indexing mechanism, and means comprising a member movable by the operator which when moved to a certain position during one cycle of the machine permits the next succeeding cycle only to take place.

55. In an automatic multiple spindle chucking machine, a stationary part and a rotary part, one provided with a series of tool holding members and the other with a series of work holding members, one series of members consisting of rotary spindles arranged horizontally and radially, means for rotating the spindles, means for causing relative reciprocating motion horizontally and radially between the tool and work carrying members, and automatically controlled means for indexing the rotary part.

56. In an automatic multiple spindle chucking machine, a stationary part and a rotary part, one provided with a series of tool holding members and the other with a series of work carrying members, one series of members consisting of spindles arranged horizontally and radially, means for rotating the spindles, means for causing relative reciprocating motion horizontally and radially between the tool and work carrying members, means for indexing the rotary part, and a controller for automatically timing the operation of the indexing means.

57. In an automatic multiple spindle chucking machine, a stationary part and a rotary part, one provided with a series of tool holding members and the other with a series of work carrying members, one series of members consisting of spindles, means for causing relative reciprocating motion horizontally and radially between the tool and work carrying members, and means comprising a controller for automatically controlling the spindle driving means.

58. In an automatic multiple spindle chucking machine, a stationary part and a rotary part, one provided with a series of tool holding members and the other with a series of work carrying members, one series of members consisting of rotary spindles arranged horizontally and radially, means for rotating the spindles, separate operating mechanisms for causing relative reciprocating motion between the tool and work carrying members, said mechanisms being clutch controlled, and means comprising a controller for automatically causing said clutch controlled mechanisms to be thrown into operation.

59. In an automatic multiple spindle chucking machine, a stationary part and a rotary part, one provided with a series of tool holding members and the other with a series of work carrying members, one series of members consisting of spindles arranged horizontally and radially, spindle driving mechanism, means for causing relative reciprocating motion horizontally and radially between the tool and work carrying members, means for indexing the rotary part, and a controller for automatically timing the operation of the indexing means and for controlling the spindle driving mechanism.

60. In an automatic multiple spindle chucking machine, a stationary part and a rotary part, one provided with a series of tool holding members and the other with a series of work carrying members, one series of members consisting of rotary spindles arranged horizontally and radially, means for rotating the spindles, separate operating mechanisms for causing relative reciprocating motion between the tool and work carrying members, said mechanisms being clutch controlled, means for indexing the rotary part, and means comprising a controller for automatically causing said clutch controlled mechanisms to be thrown into operation and for automatically timing the operation of the indexing mechanism.

61. In an automatic multiple spindle chucking machine, a stationary part and a rotary part, one provided with a series of tool holding members and the other with a series of work carrying members, one series of members consisting of rotary spindles arranged horizontally and radially, means for rotating the spindles, separate operating mechanisms for causing relative reciprocating motion between the tool and work carrying members, said mechanisms being clutch controlled, and means comprising a controller for automatically causing the clutch controlled mechanisms to be thrown into operation and for controlling the spindle rotating means.

62. In an automatic multiple spindle chucking machine, a stationary part and a rotary part, one provided with a series of tool holding members and the other with a series of work carrying members, one series of members consisting of rotary spindles arranged horizontally and radially, driving means for rotating the spindles, operating mechanisms for causing relative reciprocating motion in a horizontal direction between the tool and work carrying members, means for automatically throwing said mechanisms out of operation, means for indexing the rotary part, and means comprising a controller for throwing the spindle driving mechanism out of operation, for causing the indexing means to operate and for starting the relative reciprocating movements between the tool and work carrying members.

In testimony whereof, I hereunto affix my signature.

JOHN J. N. VAN HAMERSVELD.